(12) United States Patent
Grasmann et al.

(10) Patent No.: US 12,428,561 B2
(45) Date of Patent: Sep. 30, 2025

(54) SILICONE-POLYETHER COPOLYMER, SEALANTS COMPRISING SAME, AND RELATED METHODS

(71) Applicant: DOW SILICONES CORPORATION, Midland, MI (US)

(72) Inventors: Martin Grasmann, Midland, MI (US); Bizhong Zhu, Midland, MI (US); Brian Harkness, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 18/861,852

(22) PCT Filed: May 3, 2023

(86) PCT No.: PCT/US2023/020804
§ 371 (c)(1),
(2) Date: Oct. 30, 2024

(87) PCT Pub. No.: WO2023/215360
PCT Pub. Date: Nov. 9, 2023

(65) Prior Publication Data
US 2025/0109292 A1    Apr. 3, 2025

Related U.S. Application Data

(60) Provisional application No. 63/338,198, filed on May 4, 2022.

(51) Int. Cl.
| | | |
|---|---|---|
| C08L 83/12 | (2006.01) | |
| C08G 77/18 | (2006.01) | |
| C08G 77/46 | (2006.01) | |
| C09K 3/10 | (2006.01) | |

(52) U.S. Cl.
CPC .............. *C08L 83/12* (2013.01); *C08G 77/18* (2013.01); *C08G 77/46* (2013.01); *C09K 3/1006* (2013.01); *C08G 2190/00* (2013.01)

(58) Field of Classification Search
CPC ... C08G 65/336; C08L 71/02; C08L 2205/02; C08L 2205/025; C09D 171/02; C09J 171/02
See application file for complete search history.

(56) References Cited

U.S. PATENT DOCUMENTS

| | | |
|---|---|---|
| 3,627,722 A | 12/1971 | Seiter |
| 3,632,557 A | 1/1972 | Brode et al. |
| 3,971,751 A | 7/1976 | Isayama et al. |
| 4,345,053 A | 8/1982 | Rizk et al. |
| 4,625,012 A | 11/1986 | Rizk et al. |
| 5,403,881 A | 4/1995 | Okawa et al. |
| 5,623,044 A | 4/1997 | Chiao |
| 5,833,423 A | 11/1998 | Yamaguchi et al. |
| 5,852,137 A | 12/1998 | Hsieh et al. |
| 6,197,912 B1 | 3/2001 | Huang et al. |
| 6,310,170 B1 | 10/2001 | Johnston et al. |
| 7,307,134 B2 | 12/2007 | Lim et al. |
| 7,994,262 B2 * | 8/2011 | Kono .................. C08L 101/10 528/901 |
| 8,138,297 B2 | 3/2012 | Huang et al. |
| 2002/0198352 A1 | 12/2002 | Tanaka et al. |
| 2009/0182091 A1 | 7/2009 | Noro et al. |
| 2010/0216925 A1 | 8/2010 | Yano |
| 2022/0002541 A1 | 1/2022 | Sato |

FOREIGN PATENT DOCUMENTS

| | | |
|---|---|---|
| CN | 105085864 A | 11/2015 |
| JP | H05287189 A | 11/1993 |
| JP | H0912709 A | 1/1997 |
| JP | H11269369 A | 10/1999 |
| JP | 2009249494 A | 10/2009 |
| JP | 2021098806 A | 7/2021 |
| WO | 2019005710 A1 | 1/2019 |
| WO | 2019005711 A1 | 1/2019 |
| WO | 2019005713 A1 | 1/2019 |
| WO | 2019005792 A1 | 1/2019 |
| WO | 2019005794 A1 | 1/2019 |
| WO | 2019005795 A1 | 1/2019 |

OTHER PUBLICATIONS

International Search Report for PCT/US2023/020804 dated Aug. 4, 2023, 3 pages.
Machine assisted English translation of CN105085864A obtained from https://worldwide.espacenet.com/patent on Oct. 21, 2024, 5 pages.
Machine assisted English translation of JPH0912709A obtained from <https://worldwide.espacenet.com/patent> on Sep. 19, 2023, 11 pages.

* cited by examiner

*Primary Examiner* — Marc S Zimmer
(74) *Attorney, Agent, or Firm* — Warner Norcross + Judd LLP

(57) ABSTRACT

A composition comprises at least one silicone-polyether copolymer having the average formula $X_g[Z_jY_o]_c$, where each X is an independently selected silicone moiety having a particular structure, each Y is an independently selected polyether moiety, each Z is an independently selected organosilicon moiety, subscript c is from 1 to 150, subscript g is >1, subscript j is independently 0 or 1, and subscript o is independently 0 or 1, with the provisos that $1 \leq j+o \leq 2$ in each moiety indicated by subscript c and that there is at least one moiety indicated by subscript c in which subscript o is 1. A method of preparing the composition is also disclosed, along with a sealant formed therewith.

18 Claims, 1 Drawing Sheet

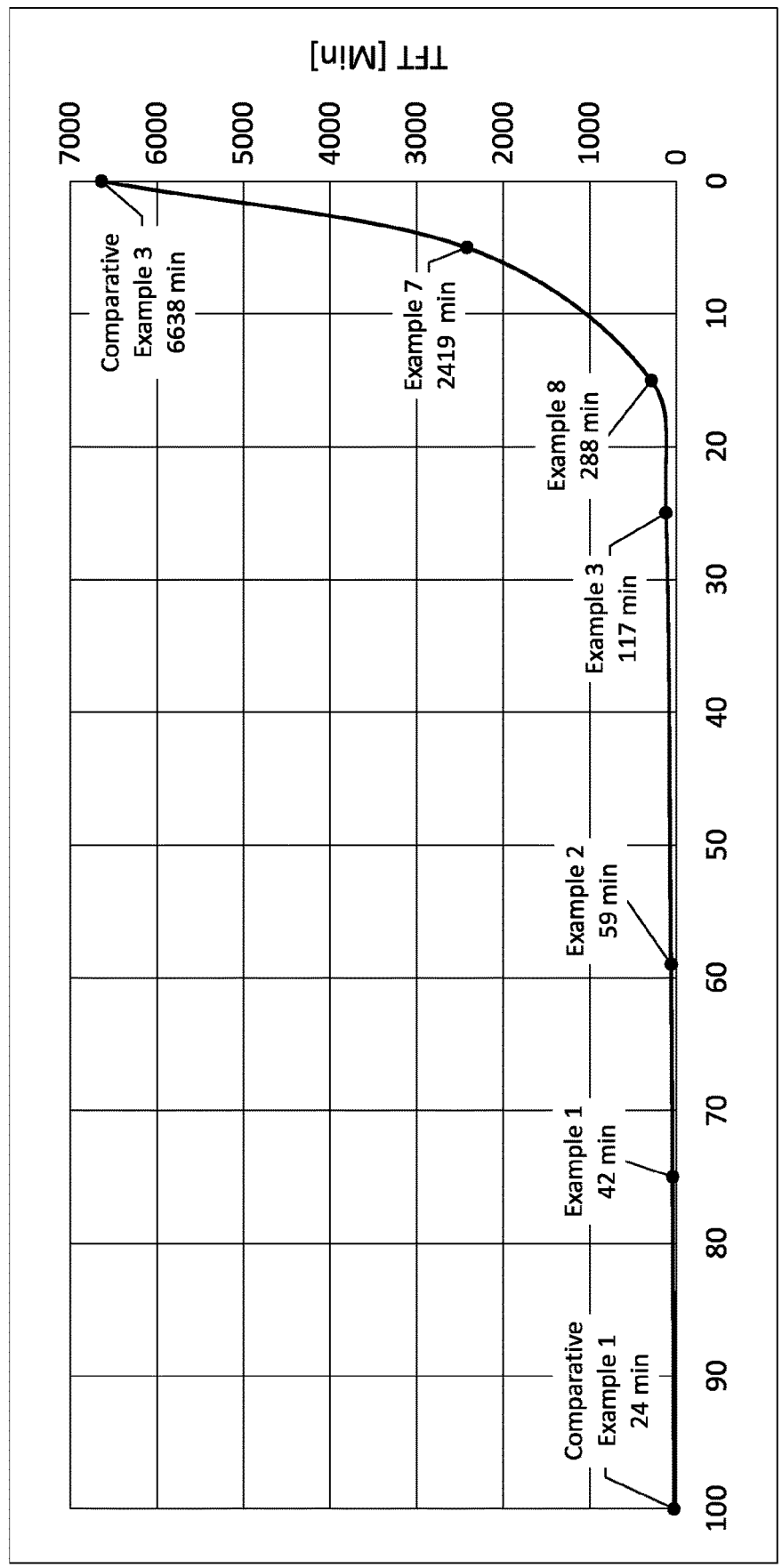

SILICONE-POLYETHER COPOLYMER, SEALANTS COMPRISING SAME, AND RELATED METHODS

CROSS-REFERENCE TO RELATED APPLICATIONS

This application is the U.S. national stage of PCT/US2023/020804 filed on 3 May 2023, which claims priority to and all advantages of U.S. Provisional Patent Application No. 63/338,198 filed on 4 May 2022, the content of which is incorporated herein by reference.

FIELD OF THE INVENTION

The present invention generally relates to compositions and copolymers and, more specifically, to a composition comprising at least one silicone-polyether copolymer, methods of preparing the same, and sealants comprising the same.

DESCRIPTION OF THE RELATED ART

Sealants are known in the art and are utilized in myriad end use applications and environments. Physical and performance properties of sealants, as well as the particular curing mechanism associated therewith, are generally selected based on the particular end use application and environment in which the sealants are utilized. Sealants can be based on a variety of different chemistries and cure mechanisms. For example, sealants can be silicone-based and include organopolysiloxanes. Alternatively, sealants can be organic and include organic components, e.g. to form urethanes. Increasingly, hybrid materials are utilized in sealants, which can combine the benefits traditionally associated with silicone-based sealants and organic sealants.

For example, silane modified polyethers are increasingly utilized in sealants as hybrid materials. However, existing silane modified polyethers have limitations. For example, sealants including conventional silane modified polyethers have undesirable cure speeds, or cure speeds that cannot be selectively controlled or tuned based on desired properties. In addition, maximizing the cure speed of conventional sealants can require high concentrations of catalysts, or otherwise influence performance properties of the resulting cured product. As such, it's difficult or impossible to optimize cure speed and performance properties simultaneously.

BRIEF SUMMARY

A composition comprising at least one silicone-polyether copolymer having the average formula $X_g[Z_jY_o]_c$ is disclosed. Each X is independently a silicone moiety having one of formulas (I) or (II):

(I)

(II)

wherein each Y is an independently selected polyether moiety, each Z is an independently selected organosilicon moiety, each $R^1$ is an independently selected substituted or unsubstituted hydrocarbyl group having from 1 to 18 carbon atoms; each $R^2$ is an independently selected alkyl group having from 1 to 8 carbon atoms; each D is independently a divalent hydrocarbon group having from 2 to 18 carbon atoms; each $D^1$ is independently a divalent hydrocarbon group having from 2 to 18 carbon atoms; each subscript a is independently 0 or 1; subscript c is from 1 to 150; subscript g>1; each subscript j is independently 0 or 1; each subscript o is independently 0 or 1, with the provisos that $1 \leq j+o \leq 2$ in each moiety indicated by subscript c and that there is at least one moiety indicated by subscript c in which subscript o is 1. The composition is subject to at least one of the following provisos: (i) the silicone-polyether copolymer includes at least one silicone moiety X of formula (I) and at least one silicone moiety X of formula (II); and/or (ii) the composition comprises at least one silicone-polyether copolymer (A) where each silicone moiety X is of formula (I), and at least one silicone-polyether copolymer (B) where each silicone moiety X is of formula (II).

A method of preparing the silicone-polyether copolymer is disclosed. The method comprises reacting a polyether compound having on average more than one terminal unsaturated group, optionally a chain extending organosilicon compound, a first endcapping organosilicon compound, and a second endcapping organosilicon compound different from the first endcapping organosilicon compound, in the presence of a hydrosilylation catalyst to prepare the composition comprising the at least one silicone-polyether copolymer.

A sealant is also disclosed. The sealant comprises the composition comprising the at least one silicone-polyether copolymer and a condensation reaction catalyst.

A cured product is additionally disclosed. The cured product is formed from the sealant. Further, a composite article and a method of preparing the composite article are disclosed. The composite article comprises a substrate and the cured product disposed on the substrate. The method comprising disposing the sealant on the substrate, and curing the sealant to give the cured product on the substrate, thereby preparing the composite article.

DESCRIPTION OF THE DRAWINGS

Various advantages and aspects of this disclosure may be understood in view of the following detailed description when considered in connection with the accompanying drawing, wherein:

FIG. 1 shows tack free time (TFT) of sealants from certain Examples of this disclosure.

DETAILED DESCRIPTION OF THE INVENTION

A composition comprising at least one silicone-polyether copolymer having the average formula $X_g[Z_jY_o]_c$ is disclosed. Each X is independently a silicone moiety having one of formulas (I) or (II):

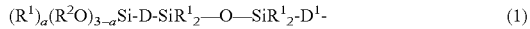

(1)

(II)

wherein each Y is an independently selected polyether moiety, and each Z is an independently selected organosilicon moiety, where each $R^1$ is an independently selected substituted or unsubstituted hydrocarbyl group having from 1 to 18 carbon atoms; each $R^2$ is an independently selected alkyl group having from 1 to 8 carbon atoms; each D is independently a divalent hydrocarbon group having from 2 to 18 carbon atoms; each $D^1$ is independently a divalent hydrocarbon group having from 2 to 18 carbon atoms; each subscript a is independently 0 or 1; subscript c is from 1 to 150; subscript g>1; each subscript j is 0 or 1; each subscript o is independently 0 or 1, with the provisos that $1 \leq j+o \leq 2$ in each moiety indicated by subscript c and that there is at least one moiety indicated by subscript c in which subscript o is 1. The composition is subject to at least one of the following provisos: (i) the silicone-polyether copolymer includes at least one silicone moiety X of formula (I) and at least one silicone moiety X of formula (II); and/or (ii) the composition comprises at least one silicone-polyether copolymer (A) where each silicone moiety X is of formula (I), and at least one silicone-polyether copolymer (B) where each silicone moiety X is of formula (II). In one embodiment, the composition may comprise at least one silicone-polyether copolymer where each silicone moiety X is of formula (II), but where subscript a is different in each silicone moiety X of formula (II).

Each $R^1$ is independently selected and may be linear, branched, cyclic, or combinations thereof. Cyclic hydrocarbyl groups encompass aryl groups as well as saturated or non-conjugated cyclic groups. Cyclic hydrocarbyl groups may be monocyclic or polycyclic. Linear and branched hydrocarbyl groups may independently be saturated or unsaturated. One example of a combination of a linear and cyclic hydrocarbyl group is an aralkyl group. By "substituted," it is meant that one or more hydrogen atoms may be replaced with atoms other than hydrogen (e.g. a halogen atom, such as chlorine, fluorine, bromine, etc.), or a carbon atom within the chain of $R^1$ may be replaced with an atom other than carbon, i.e., $R^1$ may include one or more heteroatoms within the chain, such as oxygen, sulfur, nitrogen, etc. Suitable alkyl groups are exemplified by, but not limited to, methyl, ethyl, propyl (e.g., isopropyl and/or n-propyl), butyl (e.g., isobutyl, n-butyl, tert-butyl, and/or sec-butyl), pentyl (e.g., isopentyl, neopentyl, and/or tert-pentyl), hexyl, as well as branched saturated hydrocarbon groups of 6 carbon atoms. Suitable aryl groups are exemplified by, but not limited to, phenyl, tolyl, xylyl, naphthyl, benzyl, and dimethyl phenyl. Suitable alkenyl groups include vinyl, allyl, propenyl, isopropenyl, butenyl, isobutenyl, pentenyl, heptenyl, hexenyl, and cyclohexenyl groups. Suitable monovalent halogenated hydrocarbon groups include, but are not limited to, a halogenated alkyl group of 1 to 6 carbon atoms, or a halogenated aryl group of 6 to 10 carbon atoms. Suitable halogenated alkyl groups are exemplified by, but not limited to, the alkyl groups described above where one or more hydrogen atoms is replaced with a halogen atom, such as F or Cl. For example, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl, 2,2-difluorocyclopropyl, 2,3-difluorocyclobutyl, 3,4-difluorocyclohexyl, and 3,4-difluoro-5-methylcycloheptyl, chloromethyl, chloropropyl, 2-dichlorocyclopropyl, and 2,3-dichlorocyclopentyl are examples of suitable halogenated alkyl groups. Suitable halogenated aryl groups are exemplified by, but not limited to, the aryl groups described above where one or more hydrogen atoms is replaced with a halogen atom, such as F or Cl. For example, chlorobenzyl and fluorobenzyl are suitable halogenated aryl groups.

In certain embodiments, each of $R^1$ is an independently selected alkyl group. In specific embodiments, each $R^1$ is methyl.

Each $R^2$ is an independently selected alkyl group having from 1 to 8, alternatively from 1 to 6, alternatively from 1 to 4, alternatively 1 or 2, alternatively 1, carbon atoms.

With regard to the silicone-polyether copolymer, it is to be understood that the subformula $[Z_jY_o]_c$ is not intended to imply a linear structure of the silicone-polyether copolymer moieties indicated by ZY. Rather, as understood in the art, the silicone-polyether copolymer ZY may be linear or branched, with each moiety indicated by subscript c being independently selected. As such, the silicone-polyether copolymer comprises c number of copolymer moieties ZY, which each comprise o number of polyether moieties Y and j number of organosilicon moieties Z. Additionally, as will be understood in view of the description below, each polyether moiety Y and organosilicon moiety Z are independently selected, both within each moiety indicated by subscript c and between such moieties, and also may each be linear or branched.

Each subscript c is from 1 to 150, such as from 1 to 100, alternatively from 1 to 50, alternatively from 1 to 25, alternatively from 1 to 10, and alternatively from 1 to 5. Subscript g is greater than 1, such as from 1.1 to 10, alternatively from 1.1 to 8, alternatively from 1.1 to 6, alternatively from 1.1 to 4, alternatively from 1.1 to 3, alternatively from 1.1 to 2, alternatively from 1.1 to 1.9, alternatively from 1.2 to 1.8, alternatively from 1.2 to 1.7, alternatively from 1.3 to 1.7, alternatively from 1.4 to 1.7, alternatively is about 1.4, 1.5, 1.6, or 1.7. Each subscript j is independently 0 or 1, and each subscript o is independently 0 or 1, with the provisos that $1 \leq j+o \leq 2$ in each moiety indicated by subscript c and that there is at least one moiety indicated by subscript c in which subscript o is 1. As such, the silicone-polyether copolymer includes at least one polyether moiety Y, but the organosilicon moiety Z is optional. Because each subscript j and each subscript o is independently selected, in the silicone-polyether copolymer, there may be moieties indicated by subscript c in which the polyether moiety Y is present but the organosilicon moiety Z is absent, moieties indicated by subscript c in which the polyether moiety Y is absent but the organosilicon moiety Z is present, etc. In certain embodiments, subscript j is 0. In other embodiments, subscript j is 1. In these or other embodiments, subscript j may be 0 when the silicone-polyether copolymer is branched, whereas subscript j may be 1 when the silicone-polyether copolymer is linear. In certain embodiments, subscript o is 0. In other embodiments, subscript o is 1. Subscripts j and o may be considered mole fractions, e.g. where when j=1 and o=1 there is a 0.5:0.5 molar ratio of organosilicon moiety Z to polyether moiety Y in a moiety indicated by subscript c. Of course, the molar ratio of Z to Y in each moiety indicated by subscript c is not limited and only applies when both the organosilicon moiety Z and the polyether moiety Y are present in each moiety indicated by subscript c. For example, when Z is present, the molar ratio of Z:Y may be independently from about 1000:1 to about 1:1000, alternatively from about 100:1 to about 1:100, alternatively from about 10:1 to about 1:10, alternatively from about 5:1 to about 1:5, alternatively from about 2:1 to about 1:2, in each moiety indicated by subscript c. As described above, the subformula $[Z_jY_o]_c$ is not intended to imply a linear structure of the silicone-polyether copolymer moieties indicated by ZY. Likewise, the subformula does not require a particular structure of any of the silicone-polyether copolymer moieties ZY. Rather, depending on the values selected for subscripts j and o, the silicone-polyether copolymer moiety indicated by subformula $[Z_jY_o]_c$ may comprise organosilicon moieties Z and polyether moieties Y in block form (e.g. Y, Z—Y, Y—Z, Y—Z—Y, Z—Y—Z—Y, YY—ZZ, ZZ—YY, etc.) or random form. In particular embodiments, the silicone-polyether copolymer comprises polyether moieties Y and organosilicon moieties Z in a 2:1 ratio. In specific embodiments, when subscript j is 1, the silicone-polyether copolymer includes in total one more polyether moiety Y than organosilicon moieties X. In some such embodiments, the polyether moieties Y and organosilicon moieties Z are present in the silicone-polyether copolymer in block form, such that the silicone-polyether copolymer has the average formula $X_gY[ZY]_c$, where subscripts c and g are defined above. In some of these embodiments, the silicone-polyether copolymer comprises linear polyether moieties Y and linear organosilicon moieties Z, and is endcapped by silicone moieties X, such that the silicone-polyether copolymer has the average formula $X_gY[ZY]_cX_{g''}$, where c is defined above, and each of g' and g" is ≥0, with the proviso that g'+g" is >1.

With regard to each X generally, each subscript a is independently 0 or 1. Typically, subscript a is 0. In some embodiments, each subscript a is 0. In certain embodiments, the silicone-polyether copolymer comprises at least one X where subscript a is 1.

Each D is an independently selected divalent hydrocarbon group having from 2 to 18 carbon atoms, alternatively from 2 to 16 carbon atoms, alternatively from 2 to 14 carbon atoms, alternatively from 2 to 12 carbon atoms, alternatively from 2 to 10 carbon atoms, alternatively from 2 to 8 carbon atoms, alternatively from 2 to 6 carbon atoms, alternatively from 2 to 4 carbon atoms, alternatively 2 or 3 carbon atoms, alternatively 2 carbon atoms. Each D may independently be linear or branched. For example, when D has two carbon atoms, D has the formula $C_2H_4$, and may be linear ($CH_2CH_2$) or branched ($CHCH_3$). In certain embodiments, D is linear. When the composition comprising the silicone-polyether copolymer is prepared in bulk, in certain embodiments, at least 90, alternatively at least 95, alternatively at least 98, alternatively 100, mol % of D are linear. In specific embodiments, each D is $C_2H_4$.

Each $D^1$ is also an independently selected divalent hydrocarbon group having from 2 to 18 carbon atoms, alternatively from 2 to 16 carbon atoms, alternatively from 2 to 14 carbon atoms, alternatively from 2 to 12 carbon atoms, alternatively from 2 to 10 carbon atoms, alternatively from 2 to 8 carbon atoms, alternatively from 2 to 6 carbon atoms, alternatively from 2 to 4 carbon atoms, alternatively 2 or 3 carbon atoms, alternatively 2 carbon atoms. Each $D^1$ may independently be linear or branched. For example, when $D^1$ has two carbon atoms, $D^1$ has the formula $C_2H_4$, and may be linear ($CH_2CH_2$) or branched ($CHCH_3$). In certain embodiments, D is linear. Each $D^1$ is typically formed via a hydrosilylation reaction when preparing the composition comprising the at least one silicone-polyether copolymer, and is thus a function of the silicon-bonded alkenyl group utilized in the hydrosilylation reaction.

Each Y is a polyether moiety. Each Y is independently selected, and may be any polyether moiety including at least one, alternatively at least two, ether moieties. Each Y may be the same as any or each other Y. Alternatively, the silicone-polyether copolymer may comprise at least two Y that are different from each other. Y can be linear or branched. Y may be divalent, trivalent, tetravalent, or have a valency greater than 4. Valency, in the context of the polyether moiety Y, refers to the number of Y—X bonds present in the silicone-polyether copolymer. In certain embodiments, the polyether moiety Y is divalent such that the silicone-polyether copolymer has the formula X—Y—X. In other embodiments, the valency of the polyether moiety may be greater than 2, in which case the polyether moiety Y is typically branched.

Each Y typically comprises a polyether having the general formula $—O—(C_nH_{2n}O)_w—$, wherein subscript n is independently selected from 2 to 4 in each moiety indicated by subscript w; and wherein subscript w is from 1 to 1000. In certain embodiments, Y comprises multiple polyethers of such a general formula, which may be present in a linear or branched form with other polyethers to form a polyether moiety Y comprising multiple oxyalkylene-based polyethers. In such embodiments, Y may comprise oxyethylene units ($C_2H_4O$), oxypropylene units ($C_3H_6O$), oxybutylene or oxytetramethylene units ($C_4H_8O$), or mixtures thereof, which may be in block form or randomized in Y. The oxyalkylene units in Y may independently be linear or branched. For example, oxyethylene units, if present, may be of formula $—CH_2CH_2O—$ or of formula $—CHCH_3O—$. Similarly, oxypropylene units may be of formula $—CH_2CH_2CH_2O—$, $—CH_2CHCH_3O—$, or $—CHCH_3CH_2O—$.

For example, Y may comprise a polyether having the general formula $—O—(C_2H_4O)_x(C_3H_6O)_y(C_4H_8O)_z—$, wherein subscript x is from 0 to 999; subscript y is from 1 to 1000; and subscript z is from 0 to 999; and wherein units indicated by subscripts x, y and z may be in randomized or block form in Y. In certain embodiments, x and z are each 0 such that the polyether of Y has the general formula $—O—(C_3H_6O)_y—$, where y is defined above.

In some embodiments, Y has the formula $-D^2-O—(C_nH_{2n}O)_w-D^2-$. In such embodiments, each $D^2$ is an independently selected divalent hydrocarbon group having from 1 to 6 carbon atoms, alternatively from 1 to 5 carbon atoms, alternatively from 1 to 4 carbon atoms, alternatively 1 or 2 carbon atoms. Each $D^2$ may independently be linear or branched. For example, when $D^2$ has two carbon atoms, $D^2$ has the formula $C_2H_4$, and may be linear ($CH_2CH_2$) or branched ($CHCH_3$). In certain embodiments, $D^2$ is linear. Any $D^2$ may be the same as or different from any particular $D^1$. In specific embodiments, each $D^2$ is $CH_2$. Each subscript n is independently selected from 2 to 4 in each moiety indicated by subscript w, and subscript w is defined above.

For example, in such embodiments, Y may have the formula $-D^2-O—(C_2H_4O)_x(C_3H_6O)_y(C_4H_8O)_z-D^2-$, wherein subscript x is from 0 to 999; subscript y is from 1 to 1000; and subscript z is from 0 to 999; and wherein units indicated by subscripts x, y and z may be in randomized or block form in Y. In certain embodiments, x and z are each 0 such that Y has the formula $-D^2-O—(C_3H_6O)_y-D^2-$, where $D^2$ and y are defined above. In specific embodiments, each $D^2$ is also $C_3H_6$. When x and z are each 0 and each $D^2$ is $C_3H_6$, Y has the formula $—C_3H_6—O—(C_3H_6O)_y—C_3H_6—$, where y is defined above.

In certain embodiments, Y has the general formula:

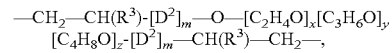
$—CH_2—CH(R^3)-[D^2]_m—O—[C_2H_4O]_x[C_3H_6O]_y[C_4H_8O]_z-[D^2]_m—CH(R^3)—CH_2—$, wherein each $R^3$ is independently a hydrocarbyl group having from 1 to 6 carbon atoms, an alkoxy group, a silyl group, or H; each $D^2$ is an independently selected divalent group having from 1 to 6 carbon atoms, subscript m is 0 or 1, subscript x is from 0 to 999, subscript y is from 1 to 1000, and subscript z is from 0 to 999, and wherein units indicated by subscripts x, y and z may be in randomized or block form in the polyether moiety Y.

Each $R^3$ is independently selected, and may any of the $C_1$-$C_6$, hydrocarbyl groups described herein. As such, any $R^3$ may be the same as or different from any particular $R^1$ and/or $R^2$. For example, $R^3$ may be methyl, propyl, etc. In certain embodiments, each $R^3$ is methyl. Alternatively, or in addition, $R^3$ may be H, an alkoxy group, or a silyl group.

Each subscript m is independently 0 or 1, such that Y may comprise 0, 1, or 2 of the divalent hydrocarbon groups $D^2$. Typically, each subscript m is 1. However, in certain embodiments at least one subscript m is 0.

In some embodiments, as described above, Y is branched. In such embodiments, Y may have the general formula $[D^2]_{m'}[P]$, where $D^2$ is defined above, subscript m' is ≥3 (e.g. 3, 4, 5, 6, 7, 8, 9, 10, etc.), and P is a polyether comprising at least one of the polyethers described above. For example, in some such embodiments, P is a polyether formed from a polyol (e.g. butane diol, glycerol, sorbitol, etc.) and a polyoxyalkylene (e.g. a polyoxypropylene), which is end-capped with m' number of $D^2$ moieties. In such instances, the number of alcohol functional groups composing the polyol will correspond to the maximum number of m'. However, if not all polyoxyalkylene chains extending from the polyol are endcapped, then m' will be less than the number of alcohol functional groups composing the polyol.

Each Y typically has a number average molecular weight ($M_n$) of at least about 100. In certain embodiments, at least one Y has a $M_n$ of at least 200, alternatively at least 300, alternatively at least 400, alternatively at least 500, alternatively at least 600, alternatively at least 700. In these or other embodiments, each Y has a $M_n$ of at least 200, alternatively at least 300, alternatively at least 400, alternatively at least 500, alternatively at least 600, alternatively at least 700, alternatively at least 1,000, alternatively at least 2,000, alternatively at least 4,000, alternatively at least 8,000, alternatively at least 12,000, alternatively at least 16,000, alternatively at least 25,000, alternatively at least 50,000. Each Y is typically chosen based on the presence of absence of Z. For example, when Z is present, the $M_n$ of Y may be lesser than it would otherwise be when Z is absent. Z can be utilized as a chain extending moiety in the silicone-polyether copolymer, thus allowing for polymerization and chain extension independent from the $M_n$ of each Y. The molar ratio of Z and Y can be selected by one of skill in the art based on desired performance properties and synthesis techniques. The number average molecular weight may be readily determined using Gel Permeation Chromatography (GPC) techniques based on polystyrene standards.

Each Z is an independently selected organosilicon moiety. Each organosilicon moiety Z may independently comprise a linear organosilicon moiety, a branched organosilicon moiety, or both. Likewise, any particular organosilicon moiety Z may itself comprise linear or branched segments, or comprise both linear and branched segments. As such, Z may be a linear organosilicon moiety, a branched organosilicon moiety, or an organosilicon moiety comprising at least one linear and also at least one branched segment. In certain embodiments, Z is branched (i.e., comprises at least one branched segment).

In certain embodiments, each polyether moiety Y is linear, such that the silicone-polyether copolymer may have one of the following structures (when Z is present):

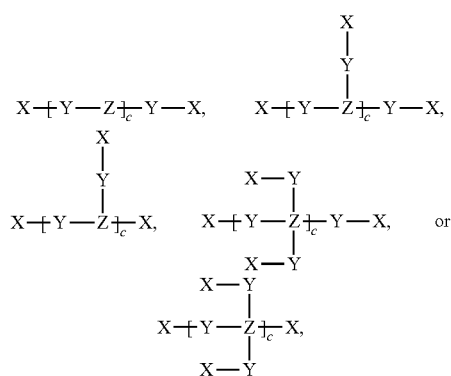

where each X, Y, Z, and subscript c are defined above. Alternatively, each polyether moiety Y may be branched. For example, the silicone-polyether copolymer may have one of the following structures (when Z is present):

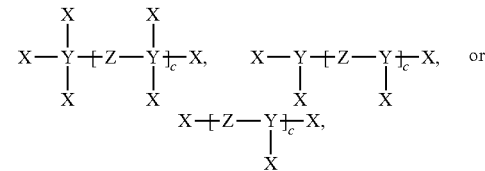

where each X, Y, Z, and subscript c are defined above. As shown in these structures, each organosilicon moiety Z may be linear or branched. In particular embodiments, both polyether moiety Y and organosilicon moiety Z may be branched, such that the silicone-polyether copolymer may have one of the following structures:

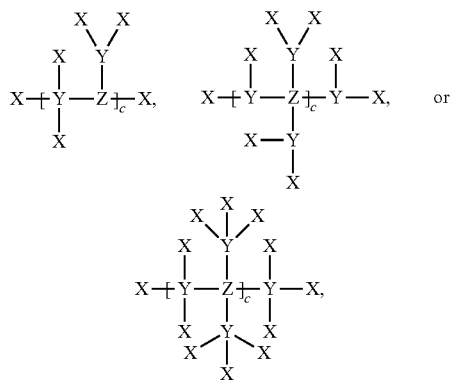

where each X, Y, Z, and subscript c are defined above.

In one embodiment, each organosilicon moiety Z independently has the formula:

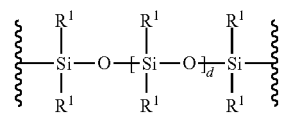

wherein each $R^1$ is independently selected and defined above, and each d is independently from 0 to 999 in each organosilicon moiety Z. In these embodiments, the organosilicon moiety Z is a siloxane moiety.

In some embodiments, each polyether moiety Y and each organosilicon moiety Z are linear, and the organosilicon moiety Z is a siloxane moiety, and the silicone-polyether copolymer has the following structure (when Z is present):

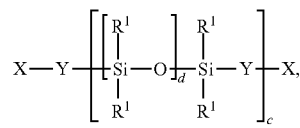

where each Y, $R^1$, subscript c, and subscript d are as defined above.

In one embodiment, each organosilicon moiety Z is not a siloxane moiety. For example, each organosilicon moiety Z may be a silyl-terminated organic compound. In specific embodiments, the organosilicon moiety Z may be of formula: $-R^1{}_2Si-R^5-SiR^1{}_2-$, wherein each $R^1$ is independently and defined above, and $R^5$ is a divalent linking group. $R^5$ may be a divalent hydrocarbon group. Typically, the divalent hydrocarbon group is free of aliphatic unsaturation. The divalent hydrocarbon group may be linear, cyclic, branched, aromatic, etc., or may have combinations of such structures. For example, $R^5$ may be a divalent aryl group. When present, the organosilicon moiety Z is formed with a chain extending organosilicon compound, which is described in greater detail below.

The composition is subject to at least one of the following provisos: (i) the silicone-polyether copolymer includes at least one silicone moiety X of formula (I) and at least one silicone moiety X of formula (II); and/or (ii) the composition comprises at least one silicone-polyether copolymer (A) where each silicone moiety X is of formula (I), and at least one silicone-polyether copolymer (B) where each silicone moiety X is of formula (II). Effectively, the composition comprises at least one silicone moiety X of formula (I) and at least one silicone moiety X of formula (II), regardless of whether the at least one silicone moiety X of formula (I) and the at least one silicone moiety X of formula (II) are present in the same or different silicone-polyether copolymers. In view of the description herein, one of skill in the art can selectively tune cure speed of the composition by selectively controlling a molar ratio of the silicone moiety X of formula (I) and the silicone moiety X of formula (II) in the composition, which have different cure speeds.

In certain embodiments, proviso (i) is true and the silicone-polyether copolymer includes at least one silicone moiety X of formula (I) and at least one silicone moiety X of formula (II). In other embodiments, proviso (ii) is true and the composition comprises at least one silicone-polyether copolymer (A) where each silicone moiety X is of formula (I), and at least one silicone-polyether copolymer (B) where each silicone moiety X is of formula (II). In other embodiments, proviso (i) is true and proviso (ii) is not true, or proviso (ii) is true and proviso (i) is not true, or both provisos (i) and (ii) are true.

In specific embodiments where proviso (i) is true, the silicone-polyether copolymer has the formula:

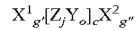

wherein $X^1$ is the silicone moiety X of formula (I), $X^2$ is the silicone moiety X of formula (II), subscript g'≥1, subscript g"≥1, and Z, Y, and subscripts j, o, and c are defined above. In more specific embodiments involving this formula, each of g' and g" is 1. In other specific embodiments involving this formula, g' is 1 or 2, and g" is 1 or 2, with the proviso that g'+g"=3.

In these or other specific embodiments where proviso (i) is true, and when subscript j>0, the silicone-polyether copolymer has the formula:

$(R^1)_a(R^2O)_{3-a}-Si-D-SiR^1{}_2-O-SiR^1{}_2-D^1-Y-[(SiR^1{}_2O)_d-SiR^1{}_2-Y]_c-D^1-Si-(OR^2)_{3-a}(R^1)_a$ wherein each Y, $R^1$, $R^2$, subscript a, D, $D^1$, subscript d, and subscript c are defined above.

In these or other specific embodiments where proviso (i) is true, and when subscript j>0, the silicone-polyether copolymer has the formula:

$(R^2O)_3-Si-D-SiR^1{}_2-O-SiR^1{}_2-D^1-Y-[(SiR^1{}_2O)_d-SiR^1{}_2-Y]_c-D^1-Si-(OR^2)_2(R^1)$ wherein each Y, $R^1$, $R^2$, D, $D^1$, subscript d, and subscript c are defined above.

In these or other specific embodiments where proviso (i) is true, and when subscript j>0, the silicone-polyether copolymer has the formula:

$(MeO)_3-Si-D-SiR^1{}_2-O-SiR^1{}_2-D^1-Y-[(SiR^1{}_2O)_d-SiR^1{}_2-Y]_c-D^1-Si-(OMe)_2(Me)$ wherein each Y, $R^1$, $R^2$, D, $D^1$, subscript d, and subscript c are defined above, and Me designates methyl.

In these or other specific embodiments where proviso (i) is true, and when subscript j>0, the silicone-polyether copolymer has the formula:

$(MeO)_3-Si-C_2H_4-SiR^1{}_2-O-SiR^1{}_2-D^1-Y-[(SiR^1{}_2O)_d-SiR^1{}_2-Y]_c-D^1-Si-(OMe)_2(Me)$ wherein each Y, $R^1$, $R^2$, D, $D^1$, subscript d, and subscript c are defined above, and Me designates methyl.

In these or other specific embodiments where proviso (i) is true, and when subscript j>0, the silicone-polyether copolymer has the formula:

$(MeO)_3-Si-C_2H_4-SiR^1{}_2-O-SiR^1{}_2-D^1-Y-[(SiR^1{}_2O)_d-SiR^1{}_2-Y]_c-D^1-Si-(OMe)_3$ wherein each Y, $R^1$, $R^2$, D, $D^1$, subscript d, and subscript c are defined above, and Me designates methyl.

In specific embodiments when proviso (i) is true, a molar ratio of silicone moiety X of formula (I) to silicone moiety X of formula (II) is from 2:98 to 98:2 (I):(II). It has been surprisingly found that cure speed can be maximized by increasing a content of silicone moieties X of formula (I), and mechanical properties of the cured product, such as modulus and elongation, can be optimized (i.e., minimized) by increasing a content of silicone moieties X of formula (II). Typically, industry focus has been on maximizing cure speed, which also undesirably increases modulus of the resulting cured products. However, by maintaining an appropriate molar ratio of silicone moiety X of formula (I) to silicone moiety X of formula (II), cure speed can be dramatically increased without sacrificing mechanical properties like modulus. In certain embodiments when proviso (i) is true, the mol % of silicone moieties X that are of formula (I) is from greater than 0 to 50, alternatively from 1 to 40, alternatively from 2 to 28, alternatively from 3 to 27 alternatively from 4 to 26, alternatively from 5 to 25, alternatively from 6 to 24, alternatively from 7 to 23, alternatively from 8 to 22, alternatively from 9 to 21, alternatively from 10 to 20, alternatively from 11 to 19, alternatively from 12 to 18, alternatively from 13 to 17, alternatively from 14 to 16, based on the total moles of silicone moieties X. In other embodiments when proviso (i) is true, the mol % of silicone moieties X that are of formula (I) is from greater than 0 to 50, alternatively from 1 to 40, alternatively from 1 to 35, alternatively from 1 to 30 alternatively from 1 to 25, alternatively from 1 to 20, alternatively from 2 to 15, based on the total moles of silicone moieties X.

In specific embodiments where proviso (ii) is true, the composition comprises at least one silicone-polyether copolymer (A) where each silicone moiety X is of formula (I), and at least one silicone-polyether copolymer (B) where each silicone moiety X is of formula (II).

In this specific embodiment where proviso (ii) is true, the silicone-polyether copolymer (A) has the formula:

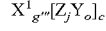

and the silicone-polyether copolymer (B) has the formula:

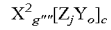

wherein $X^1$ is the silicone moiety X of formula (I), $X^2$ is the silicone moiety X of formula (II), subscript g'''>1, subscript g''''>1, and Z, Y, and subscripts j, o, and c are defined above. In other specific embodiments involving this formula, each of g''' and g'''' is 2 or 3.

In these or other specific embodiments where proviso (ii) is true, and when subscript j>0, at least one silicone-polyether copolymer (A) has the formula:

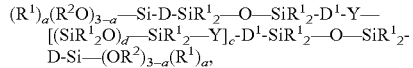

and at least one silicone-polyether copolymer (B) has the formula:

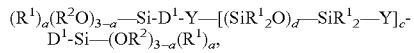

wherein each Y, $R^1$, $R^2$, subscript a, D, $D^1$, subscript d, and subscript c are defined above.

In these or other specific embodiments where proviso (ii) is true, and when subscript j>0, at least one silicone-polyether copolymer (A) has the formula:

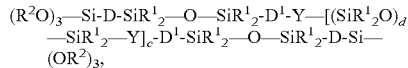

and at least one silicone-polyether copolymer (B) has the formula:

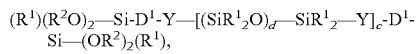

wherein each Y, $R^1$, $R^2$, D, $D^1$, subscript d, and subscript c are defined above.

In these or other specific embodiments where proviso (ii) is true, and when subscript j>0, at least one silicone-polyether copolymer (A) has the formula:

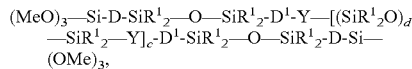

and at least one silicone-polyether copolymer (B) has the formula:

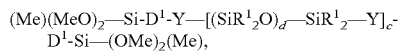

wherein each Y, $R^1$, $R^2$, D, $D^1$, subscript d, and subscript c are defined above, and Me designates methyl.

In these or other specific embodiments where proviso (ii) is true, and when subscript j>0, at least one silicone-polyether copolymer (A) has the formula:

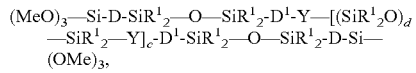

and at least one silicone-polyether copolymer (B) has the formula:

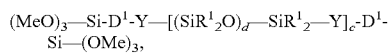

wherein each Y, $R^1$, $R^2$, D, $D^1$, subscript d, and subscript c are defined above, and Me designates methyl.

When proviso (ii) is true, the molar ratio of the silicone-polyether copolymer (A) to the silicone-polyether copolymer (B) of from 2:98 to 98:2 (A):(B). This molar ratio may be selected based on desired cure speed and performance properties of the composition and cured product thereof. Generally speaking, increasing content of the silicone moiety X of formula (I) increases cure speed relative to the content of the silicone moiety X of formula (II). The composition may also comprise three or more different silicone-polyether copolymers which different in terms of viscosity, molecular weight, structure, etc. In certain embodiments when proviso (ii) is true, the mol % of silicone-polyether copolymer (A) in the composition is from greater than 0 to 50, alternatively from 1 to 40, alternatively from 2 to 28, alternatively from 3 to 27 alternatively from 4 to 26, alternatively from 5 to 25, alternatively from 6 to 24, alternatively from 7 to 23, alternatively from 8 to 22, alternatively from 9 to 21, alternatively from 10 to 20, alternatively from 11 to 19, alternatively from 12 to 18, alternatively from 13 to 17, alternatively from 14 to 16, based on the total amount of silicone-polyether copolymers (A) and (B) in the composition. In other embodiments when proviso (ii) is true, the mol % of silicone-polyether copolymer (A) in the composition is from greater than 0 to 50, alternatively from 1 to 40, alternatively from 1 to 35, alternatively from 1 to 30 alternatively from 1 to 25, alternatively from 1 to 20, alternatively from 2 to 15, based on the total amount of silicone-polyether copolymers (A) and (B) in the composition.

The exemplary structures above are based on each X, each Y, and/or each Z in the silicone-polyether copolymer being the same. However, each X, each Y, and each Z are independently selected, as described above. As such, one of skill in the art readily understands structures associated with the silicone-polyether copolymer based on the selection of each X, each Y, and/or each Z. In addition, the exemplary structures above are generally linear. As readily understood in the art in view of the description herein, the silicone-polyether copolymer, as well as the silicone-polyether copolymer (A) and the silicone-polyether copolymer (B), may be branched. For example, in certain embodiments, the silicone-polyether copolymer includes three X moieties. The same provisos and descriptions apply in such embodiments, and one of skill in the art readily appreciates the structures of such branched silicone-polyether copolymers in view of the broad description herein.

A method of preparing the silicone-polyether copolymer is also disclosed. The method comprises reacting a polyether compound having on average more than one terminal unsaturated group, optionally a chain extending organosilicon compound, a first endcapping organosilicon compound, and a second endcapping organosilicon compound different from the first endcapping organosilicon compound, in the presence of a hydrosilylation catalyst to prepare the composition comprising the at least one silicone-polyether copolymer.

As will be understood by one of skill in the art in view of the description herein, the polyether compound utilized in the method forms a portion of the silicone-polyether copolymer corresponding to the polyether moiety Y, the chain extending organosilicon compound, if utilized in the method, forms a portion of the silicone-polyether copolymer corresponding to the organosilicon moiety Z, and the first and second endcapping organosilicon compounds utilized in the method form a portion of the silicone-polyether copolymer corresponding to the silicone moiety X (based on formulas I and II above for X).

Typically, the polyether compound has the formula: $Y^1[R^4]_i$, where each $R^4$ is an independently selected unsaturated group having from 2 to 14 carbon atoms; subscript i is >1; and $Y^1$ is polyether moiety comprising at least one polyether group.

Each $R^4$ is an independently selected unsaturated group having from 2 to 14 carbon atoms. Typically, $R^4$ comprises, alternatively is, an alkenyl group or an alkynyl group. Specific examples thereof include $H_2C=CH-$, $H_2C=CHCH_2-$, $H_2C=CHCH_2CH_2-$, $H_2C=CH$ $(CH_2)_3$—, $H_2C=CH(CH_2)_4$—, $H_2C=C(CH_3)$—, $H_2C=C(CH_3)CH_2$—, $H_2C=C(CH_3)CH_2CH_2$—, $H_2C=C(CH_3)CH_2CH(CH_3)$—, $H_2C=C(CH_3)CH(CH_3)CH_2$—, $H_2C=C(CH_3)C(CH_3)_2$—, $HC≡C$—, $HC≡CCH_2$—, $HC≡CCH(CH_3)$—, $HC≡CC(CH_3)_2$—, and $HC≡CC(CH_3)_2CH_2$—.

In certain embodiments, each $R^4$ has the formula $CH_2C(R^3)$-$[D^2]_m$-, wherein each $R^3$ is independently a hydrocarbyl group having from 1 to 6 carbon atoms, an alkoxy group, a silyl group, or H; each $D^2$ is an independently selected divalent group having from 1 to 6 carbon atoms, and subscript m is 0 or 1. In certain embodiments, $R^3$ is —$CH_3$. In these or other embodiments, $D^2$ is —$CH_2$—. In specific embodiments, each $R^4$ is $H_2C=C(CH_3)CH_2$—.

Subscript i is >1, such as 2, 3, 4, 5, 6, etc. Generally, the polyether compound comprises an $R^4$ at each terminus of $Y^1$, such that subscript i corresponds to the valency of $Y^1$, which is at least 2, but may be 3, 4, 5, or higher depending on the branching thereof. In specific embodiments, subscript i is 2. In other specific embodiments, subscript i is 3.

Each $Y^1$ is a polyether moiety comprising at least one polyether group, such as any of the polyether groups described above. Typically, the polyether group of $Y^1$ has the general formula —O—$(C_nH_{2n}O)_w$—, wherein subscript n is independently selected from 2 to 4 in each moiety indicated by subscript w, and subscript w is from 1 to 1000. In certain embodiments, at least one polyether group of $Y^1$ has the formula —O—$[C_2H_4O]_x[C_3H_6O]_y[C_4H_8O]_z$—, where each subscript x is independently from 0 to 999, each subscript y is independently from 1 to 1000, and each subscript z is independently from 0 to 999, and wherein units indicated by subscripts x, y and z may be in randomized or block form in the polyether group.

In some embodiments, $Y^1$ is branched, and has general formula $[R^4]_{i'}[P]$, where $R^4$ is defined above, subscript i' is ≥3 (e.g. 3, 4, 5, 6, 7, 8, 9, 10, etc.), and P is a branched polyether comprising at least one of the polyethers described above. For example, in some such embodiments, P is a polyether formed from a polyol (e.g. butane diol, glycerol, sorbitol, etc.) and 2, 3, or more polyoxyalkylenes (e.g. polyoxypropylenes), which is endcapped with i' number of $R^4$ moieties. In such instances, the number of alcohol functional groups composing the polyol will correspond to the maximum number of i'. However, if not all polyoxyalkylene chains extending from the polyol are endcapped, then i' will be less than the number of alcohol functional groups composing the polyol.

In certain embodiments, the polyether compound is linear and i=2, such that the polyether compound has the formula $R^4$—$Y^1$—$R^4$, where $Y^1$ and each $R^4$ are as defined above. For example, in some such embodiments, the polyether compound has the formula:

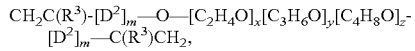

$CH_2C(R^3)$-$[D^2]_m$—O—$[C_2H_4O]_x[C_3H_6O]_y[C_4H_8O]_z$-$[D^2]_m$—$C(R^3)CH_2$, wherein each $R^3$, $D^2$, subscript m, subscript x, subscript y, and subscript z are as defined above. In specific embodiments, each $R^3$ is methyl, each $D^2$ is $CH_2$, and each subscript m is 1. In these or other embodiments, subscripts x and z are each 0, such that the polyether moiety of the polyether compound contains only oxypropylene units The chain extending organosilicon compound is typically an organosilicon compound having at least 2 terminal silicon-bonded H groups. However, the chain extending organosilicon compound may be branched, and have 3, 4, or more terminal silicon-bonded H groups. For example, the chain extending organosilicon compound may have one of the following formulas:

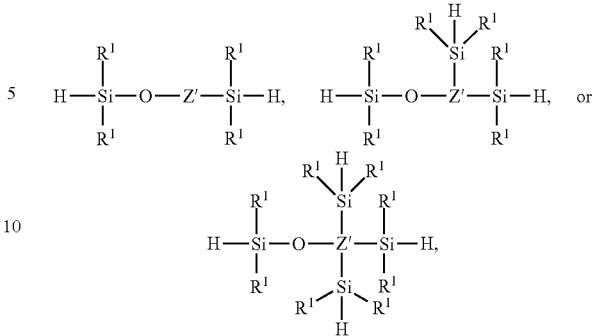

wherein Z' is a siloxane moiety and each $R^1$ is as defined above. As such, the chain extending organosilicon compound typically comprises a linear silicon hydride functional organosilicon compound, a branched silicon hydride functional organosilicon compound, or both.

In specific embodiments, the chain extending organosilicon compound is linear and is an organohydrogensiloxane having the formula:

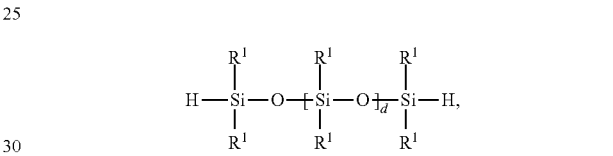

wherein each $R^1$ is as defined above, and subscript d is from 1 to 999.

In other embodiments, each Z' is not a siloxane moiety. For example, the chain extending organosilicon compound may be of formula: $HR^1_2Si$—$R^5$—$SiR^1_2H$, wherein each $R^1$ is independently and defined above, and $R^5$ is a divalent linking group. $R^5$ may be a divalent hydrocarbon group. Typically, the divalent hydrocarbon group is free of aliphatic unsaturation. The divalent hydrocarbon group may be linear, cyclic, branched, aromatic, etc., or may have combinations of such structures. For example, $R^5$ may be a divalent aryl group.

When $R^5$ is a divalent aryl group, specific examples of the chain extending organosilicon compound include:

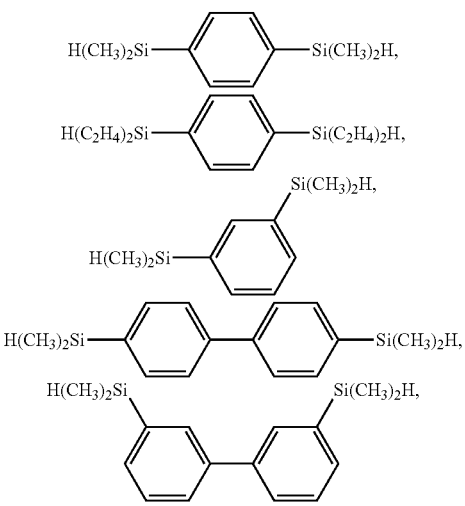

-continued

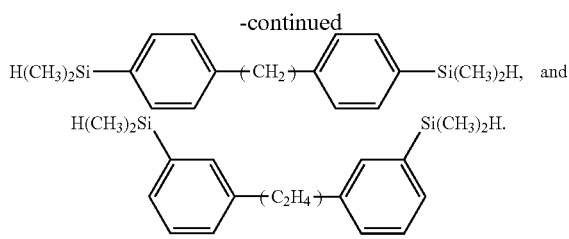

As introduced above, the first and second endcapping organosilicon compounds utilized in the method form the silicone moiety X of formulas (I) and (II) above. As such, the first and second endcapping organosilicon compounds may be any organosilicon compounds suitable for forming the silicone-polyether copolymer, including the silicone-polyether copolymer (A) and the silicone-polyether copolymer (B), as understood in the art. Typically, each of the first and second endcapping organosilicon compounds is an organohydrogensiloxane compound including at least one silicon-bonded hydrogen atom. The silicon-bonded hydrogen atom of each organohydrogensiloxane compound reacts with an unsaturated group $R^4$ of the polyether compound via a hydrosilylation reaction in the presence of the hydrosilylation catalyst utilized in the method.

In certain embodiments, the first endcapping organosilicon compound has the formula:

$(R^1)_a(R^2O)_{3-a}Si\text{-}D\text{-}SiR^1_2\text{—}O\text{—}SiR^1_2H$ wherein each $R^1$ is independently selected and defined above, each $R^2$ is an independently selected alkyl group having from 1 to 8 carbon atoms; each D is independently a divalent hydrocarbon group having from 2 to 18 carbon atoms; and subscript a is 0 or 1. The first endcapping organosilicon compound results in X of formula (I) in the silicone-polyether copolymer.

In specific embodiments, the first endcapping organosilicon compound has the formula:

$(R^2O)_3Si\text{-}D\text{-}SiR^1_2\text{—}O\text{—}SiR^1_2H$, where $R^1$ and $R^2$ are independently selected and defined above, and D is defined above.

In these or other specific embodiments, the first endcapping organosilicon compound has the formula:

$(MeO)_3Si\text{-}D\text{-}SiR^1_2\text{—}O\text{—}SiR^1_2H$, where $R^1$ is independently selected and defined above, and D is defined above.

In these or other specific embodiments, the first endcapping organosilicon compound has the formula:

$(MeO)_3Si\text{—}C_2H_4\text{—}SiR^1_2\text{—}O\text{—}SiR^1_2H$, where $R^1$ is independently selected and defined above.

In these or other specific embodiments, the first endcapping organosilicon compound has the formula:

$(MeO)_3Si\text{—}CH_2CH_2\text{—}Si(Me)_2\text{-}O\text{—}Si(Me)_2H$.

In these or other embodiments, the second endcapping organosilicon compound has the formula:

$(R^1)_a(R^2O)_{3-a}SiH$ wherein each $R^1$ is independently selected and defined above, each $R^2$ is an independently selected and defined above; each D is independently a divalent hydrocarbon group having from 2 to 18 carbon atoms; and subscript a is 0 or 1. The second endcapping organosilicon compound results in X of formula (II) in the silicone-polyether copolymer.

In specific embodiments, the second endcapping organosilicon compound has the formula:

$(R^1)(R^2O)_2SiH$ where $R^1$ and $R^2$ are independently selected and defined above.

In these or other specific embodiments, the second endcapping organosilicon compound has the formula:

$(Me)(MeO)_2SiH$, where Me designates methyl.

In other specific embodiments, the second endcapping organosilicon compound has the formula:

$(R^2O)_3SiH$, where $R^2$ is independently selected and defined above. In these specific embodiments, $R^2$ is typically independently methyl or ethyl.

Organohydrogensiloxane compounds suitable for use as the first and second endcapping organosilicon compounds can be made via any suitable technique.

A third endcapping organosilicon compound, or further endcapping organosilicon compounds, may also be utilized in the method. For example, the third endcapping organosilicon compound may fall within formula (I) or (II) for silicone moiety X, while still being distinguished from other endcapping organosilicon compounds falling within the same general formula (I) or (II).

Further still, in certain embodiments, the method can involve a transalkoxylation reaction involving one or more of the silicon-bonded alkoxy groups of the first or second endcapping organosilicon compound. By way of example, the second endcapping organosilicon compound may have the formula: $(R^2O)_3SiH$, where each $R^2$ is ethyl. In such embodiments, the ethoxy groups present in the resulting silicone-polyether copolymer may be converted to methoxy groups by reacting the ethoxy groups with methanol.

The polyether compound, optionally the chain extending organosilicon compound, and the first and second endcapping organosilicon compounds may be reacted in any order or combination to give the composition comprising the at least one silicone-polyether copolymer, as understood in the art. In addition, the order of addition or method may depend on which of provisos (i) and (ii) are true. For example, when proviso (i) is true, the polyether compound, optionally the chain extending organosilicon compound, and the first and second endcapping organosilicon compounds may be reacted together in a single pot in any order of addition. Alternatively, when proviso (ii) is true, the silicone-polyether copolymer (A) may be prepared in the absence of the second endcapping organosilicon compound, and the silicone-polyether copolymer (B) may be prepared in the absence of the first endcapping organosilicon compound, and the silicone-polyether copolymer (A) and the silicone-polyether copolymer (B) may be later combined to give the composition. Further, when utilized, the chain extending organosilicon compound can be utilized prior to the first and/or second endcapping organosilicon compounds such that chain extension occurs prior to endcapping. When both the first and second organosilicon compounds are used together in the method, i.e., when proviso (i) is true, they may be combined with the other components at the same time or at different times.

In certain embodiments, the method comprises reacting the polyether compound and the chain extending organosilicon compound in the presence of the hydrosilylation catalyst to give a siloxane-polyether compound (i.e., a chain-extended silicone-polyether compound), and reacting the siloxane-polyether compound and the first and/or second endcapping organosilicon compounds in the presence of a hydrosilylation catalyst to give the composition comprising the at least one silicone-polyether copolymer. The siloxane-polyether compound may be prepared by any suitable technique. For example, in certain embodiments, the siloxane-polyether compound is prepared by reacting the polyether compound having two terminal unsaturated groups and the chain extending organosilicon compound in the presence of a hydrosilylation catalyst to give the composition comprising the at least one siloxane-polyether compound.

The siloxane-polyether compound utilized in such embodiments forms a portion of the silicone-polyether copolymer having the formula $[Z_jY_o]_c$, where Z, Y, subscript c, and subscript j, and subscript o are defined above. For example, when polyether moieties Y and organosilicon moieties Z are present and linear, the siloxane-polyether compound may have the formula:

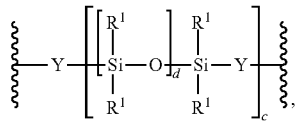

where each Y, $R^1$, subscript c, and subscript d are as defined above. Thus, the siloxane-polyether compound utilized may be selected based on the desired structure of the silicone-polyether copolymer, e.g. based on molecular weight, the particular structure of (i.e., units within) each Y, the degree of polymerization of the siloxy units represented by subscript d, etc.

In certain embodiments, the siloxane-polyether compound has the formula:

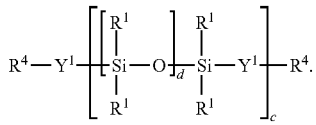

In such embodiments, each $Y^1$, $R^1$, and $R^4$ is as defined above, and subscript c is typically from 1 to 150, such as from 1 to 100, alternatively from 1 to 50, alternatively from 1 to 25, alternatively from 1 to 10, and alternatively from 1 to 5. Typically, each subscript d is from 1 to 1000, such as from 1 to 500, alternatively from 1 to 300, alternatively from 1 to 100, alternatively from 1 to 50, alternatively from 1 to 10, in each moiety indicated by subscript c.

The polyether compound and the chain extending organosilicon compound, when utilized, are typically reacted in a molar ratio of from 1.001:1 to 2:1; alternatively from 1.4:1 to 1.7:1; alternatively from 1.05:1 to 1.5:1; alternatively from 1.1:1 to 1.2:1; alternatively from 1.2:1 to 1.5:1. The siloxane-polyether compound is typically formed by the molar ratio of the polyether compound and the chain extending organosilicon compound to reach a desired value of subscript c.

The silicone-polyether compound and the first and/or second endcapping organosilicon compounds are typically reacted in a molar ratio between unsaturated groups of the silicone-polyether compound and silicon hydride groups of the first and second endcapping organosilicon compounds of from 1.5:1 to 1:1.5, alternatively from 1.4:1 to 1:1.4, alternatively from 1.3:1 to 1:1.3, alternatively from 1.2:1 to 1:1.2, alternatively from 1.1:1 to 1:1.1, alternatively from 1.1:1 to 1:1. When the silicone-polyether compound is difunctional, the silicone-polyether copolymer is typically formed by a 1:2 molar ratio of the silicone-polyether compound and the first and second endcapping organosilicon compounds, although a molar excess of one relative to the other may be utilized.

In certain embodiments, the method comprises reacting the polyether compound and the first and/or second endcapping organosilicon compound in the presence of the hydrosilylation catalyst to give an endcapped silicone-polyether compound, and reacting the endcapped silicone-polyether compound and the chain extending organosilicon compound in the presence of the hydrosilylation catalyst to give the composition comprising the at least one silicone-polyether copolymer. In these or other embodiments, the method comprises reacting at least some of the polyether compound and some of the first and/or second endcapping organosilicon compound to give the composition comprising the at least one endcapped silicone-polyether compound, and also reacting at least some of the polyether compound and some of the chain extending organosilicon compound to give the composition comprising the at least one siloxane-polyether compound, as each described above. In yet other embodiments, where the chain extending organosilicon compound is not utilized, the method comprises reacting the polyether compound and the first and/or second endcapping organosilicon compound in the presence of the hydrosilylation catalyst to give the composition comprising the at least one silicone-polyether copolymer.

The hydrosilylation-reaction catalyst is not limited and may be any known hydrosilylation-reaction catalyst for catalyzing hydrosilylation reactions. Combinations of different hydrosilylation-reaction catalysts may be utilized.

In certain embodiments, the hydrosilylation-reaction catalyst comprises a Group VIII to Group XI transition metal. Group VIII to Group XI transition metals refer to the modern IUPAC nomenclature. Group VIII transition metals are iron (Fe), ruthenium (Ru), osmium (Os), and hassium (Hs); Group IX transition metals are cobalt (Co), rhodium (Rh), and iridium (Ir); Group X transition metals are nickel (Ni), palladium (Pd), and platinum (Pt); and Group XI transition metals are copper (Cu), silver (Ag), and gold (Au). Combinations thereof, complexes thereof (e.g. organometallic complexes), and other forms of such metals may be utilized as the hydrosilylation-reaction catalyst.

Additional examples of catalysts suitable for the hydrosilylation-reaction catalyst include rhenium (Re), molybdenum (Mo), Group IV transition metals (i.e., titanium (Ti), zirconium (Zr), and/or hafnium (Hf)), lanthanides, actinides, and Group I and II metal complexes (e.g. those comprising calcium (Ca), potassium (K), strontium (Sr), etc.). Combinations thereof, complexes thereof (e.g. organometallic complexes), and other forms of such metals may be utilized as the hydrosilylation-reaction catalyst.

The hydrosilylation-reaction catalyst may be in any suitable form. For example, the hydrosilylation-reaction catalyst may be a solid, examples of which include platinum-based catalysts, palladium-based catalysts, and similar noble metal-based catalysts, and also nickel-based catalysts. Specific examples thereof include nickel, palladium, platinum, rhodium, cobalt, and similar elements, and also platinum-palladium, nickel-copper-chromium, nickel-copper-zinc, nickel-tungsten, nickel-molybdenum, and similar catalysts comprising combinations of a plurality of metals. Additional examples of solid catalysts include Cu—Cr, Cu—Zn, Cu—Si, Cu—Fe—Al, Cu—Zn—Ti, and similar copper-containing catalysts, and the like.

The hydrosilylation-reaction catalyst may be in or on a solid carrier. Examples of carriers include activated carbons, silicas, silica aluminas, aluminas, zeolites and other inorganic powders/particles (e.g. sodium sulphate), and the like. The hydrosilylation-reaction catalyst may also be disposed in a vehicle, e.g. a solvent which solubilizes the hydrosilylation-reaction catalyst, alternatively a vehicle which merely carries, but does not solubilize, the hydrosilylation-reaction catalyst. Such vehicles are known in the art.

In specific embodiments, the hydrosilylation-reaction catalyst comprises platinum. In these embodiments, the hydrosilylation-reaction catalyst is exemplified by, for example, platinum black, compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum chloride, and complexes of such compounds with olefins or organopolysiloxanes, as well as platinum compounds microencapsulated in a matrix or core-shell type compounds. Microencapsulated hydrosilylation catalysts and methods of their preparation are also known in the art, as exemplified in U.S. Pat. Nos. 4,766,176 and 5,017,654, which are incorporated by reference herein in their entireties.

Complexes of platinum with organopolysiloxanes suitable for use as the hydrosilylation-reaction catalyst include 1,3-diethenyl-1,1,3,3-tetramethyldisiloxane complexes with platinum. These complexes may be microencapsulated in a resin matrix. Alternatively, the hydrosilylation-reaction catalyst may comprise 1,3-diethenyl-1,1,3,3-tetramethyldisiloxane complex with platinum. The hydrosilylation-reaction catalyst may be prepared by a method comprising reacting chloroplatinic acid with an aliphatically unsaturated organosilicon compound such as divinyltetramethyldisiloxane, or alkene-platinum-silyl complexes. Alkene-platinum-silyl complexes may be prepared, for example by mixing 0.015 mole (COD)PtCl$_2$ with 0.045 mole COD and 0.0612 moles HMeSiCl$_2$, where COD represents cyclooctadiene.

Additional examples of suitable hydrosilylation catalysts for component are described in, for example, U.S. Pat. Nos. 3,159,601; 3,220,972; 3,296,291; 3,419,593; 3,516,946; 3,814,730; 3,989,668; 4,784,879; 5,036,117; and 5,175,325; the disclosures of which are incorporated herein by reference in their entireties.

The hydrosilylation catalyst may also, or alternatively, be a photoactivatable hydrosilylation catalyst, which may initiate curing via irradiation and/or heat. The photoactivatable hydrosilylation catalyst can be any hydrosilylation catalyst capable of catalyzing the hydrosilylation reaction, particularly upon exposure to radiation having a wavelength of from 150 to 800 nanometers (nm).

In certain embodiments, the silicone-polyether copolymer may be prepared in the absence of any solvent or vehicle. In other embodiments, the silicone-polyether copolymer is formed in the presence of a diluent, which is generally non-reactive with the silicone-polyether copolymer or the components utilized to prepare it. The diluent may be a solvent or vehicle, examples of which are described below with reference to the sealant formed with the composition.

In such embodiments, the solvent or vehicle may be removed from the composition after preparing the silicone-polyether copolymer, or may remain. In other embodiments, the diluent may be considered a plasticizer, particularly when the composition is utilized to prepare a sealant. For example, conventional sealants often include a plasticizer, and thus the plasticizer may provide benefits when preparing the silicone-polyether copolymer, in terms of reduced viscosity of the reaction mixture, and may remain in the composition for sealant purposes, thus reducing an additional compounding step relative to the sealant.

The composition may be utilized in various end use applications. In certain embodiments, the composition is further defined as a sealant. When the composition is a sealant, the sealant comprises a condensation reaction catalyst. Embodiments involving the composition as a sealant are below.

The condensation reaction catalyst is not limited and, in some embodiments, is exemplified by tin catalysts, titanium catalysts, zirconate catalysts, and zirconium catalysts. General examples of suitable tin catalysts include organotin compounds where the valence of the tin is either +4 or +2 (e.g. tin (IV) compounds and/or tin (II) compounds). Specific examples of tin (IV) compounds include stannic salts of carboxylic acids such as dibutyl tin dilaurate, dimethyl tin dilaurate, di-(n-butyl)tin bis-ketonate, dibutyl tin diacetate, dibutyl tin maleate, dibutyl tin diacetylacetonate, dibutyl tin dimethoxide, carbomethoxyphenyl tin tris-uberate, dibutyl tin dioctanoate, dibutyl tin diformate, isobutyl tin triceroate, dimethyl tin dibutyrate, dimethyl tin di-neodeconoate, dibutyl tin di-neodeconoate, triethyl tin tartrate, dibutyl tin dibenzoate, butyltintri-2-ethylhexanoate, dioctyl tin diacetate, tin octylate, tin oleate, tin butyrate, tin naphthenate, dimethyl tin dichloride, a combination thereof, and/or a partial hydrolysis product thereof. Additional examples of tin (IV) compounds are known in the art and are commercially available, such as Metatin® 740 and Fascat® 4202 from Acima Specialty Chemicals of Switzerland, Europe, which is a business unit of The Dow Chemical Company, as well as Formrez® UL-28 from Galata Chemicals of Hahnville, LA. Specific examples of tin (II) compounds include tin (II) salts of organic carboxylic acids such as tin (II) diacetate, tin (II) dioctanoate, tin (II) diethylhexanoate, tin (II) dilaurate, stannous salts of carboxylic acids such as stannous octoate, stannous oleate, stannous acetate, stannous laurate, stannous stearate, stannous naphthanate, stannous hexanoate, stannous succinate, stannous caprylate, and a combination thereof. Examples of suitable titanium catalysts include titanium esters such as tetra-n-butyltitanate tetraisopropyltitanate, tetra-2-ethylhexyltitanate, tetraphenyltitanate, triethanolamine titanate, organosiloxytitanium compounds, and dicarbonyl titanium compounds, such as titanium ethyl acetoacetate, diisopropoxydi(ethoxyacetoacetyl) titanium and bis(acetoacetonyl)-diisopropoxy titanium (IV). Many of these titanium catalysts are commercially available, such as Tyzor™ DC, Tyzor™ TnBT, and Tyzor™ 9000 from Dorf Ketal Specialty Catalysts LLC of Houston, TX. In certain embodiments, the condensation reaction catalyst is a titanium catalyst, such as one of those exemplified above, e.g. where the sealant is or may be formulated as a room temperature vulcanizing sealant composition. The amount of the condensation reaction catalyst present in the sealant depends on various factors (e.g. the amount and/or type of the at least one silicone-polyether copolymer, the types and/or amounts of any additional materials present in the sealant, etc.), and may be readily determined by one of skill in the art. In one embodiment, the sealant comprises the condensation reaction catalyst in an amount of from 0.2 to 6, alternatively from 0.5 to 3, parts by weight based on the total weight of the at least one silicone-polyether copolymer present in the sealant. In other embodiments, the sealant comprises the condensation reaction catalyst in an amount of from greater than 0 to 0.2, alternatively from greater than 0 to 0.15, alternatively from greater than 0 to 0.125, alternatively from greater than 0 to 0.10, parts by weight based on the total weight of the at least one silicone-polyether copolymer present in the sealant.

In some embodiments, the sealant further comprises one or more additives. Examples of suitable additives that may be present in the sealant include fillers, treating agents (e.g. filler treating agents), cross-linkers, adhesion promotors, surface modifiers, drying agents, extenders, biocides, flame retardants, plasticizers, end-blockers, binders, anti-aging additives, water release agents, pigments, dyes, rheology modifiers, carriers, tackifying agents, corrosion inhibitors, catalyst inhibitors, viscosity modifiers, UV absorbers, antioxidants, light-stabilizers, and the like, as well as combinations thereof.

In certain embodiments, the sealant includes a filler. The filler may be or comprise a reinforcing filler, an extending filler, a conductive filler (e.g., electrically conductive, thermally conductive, or both), or the like, or a combination thereof. Examples of suitable reinforcing fillers include precipitated calcium carbonates and reinforcing silica fillers such as fume silica, silica aerogel, silica xerogel, and precipitated silica. Specific suitable precipitated calcium carbonates include Winnofil® SPM from Solvay and Ultrapflex® and Ultrapflex® 100 from Specialty Minerals, Inc. Examples of fumed silicas are known in the art and are commercially available, such as those sold under the name CAB-O-SIL by Cabot Corporation of Massachusetts, U.S.A. Examples of suitable extending fillers include crushed quartz, aluminum oxide, magnesium oxide, calcium carbonate such as ground calcium carbonate, precipitated calcium carbonate, zinc oxide, talc, diatomaceous earth, iron oxide, clays, mica, chalk, titanium dioxide, zirconia, sand, carbon black, graphite, or a combination thereof. Examples of extending fillers are known in the art and are commercially available, including ground quartz sold under the name MIN-U-SIL by U.S. Silica of Berkeley Springs, WV. Other examples of commercially available extending fillers include calcium carbonates sold under the name CS-11 from Imerys, G3T from Huber, Pfinyl 402 from Specialty Minerals, Inc. and Omyacarb 2T from Omya. The amount of the filler present in the sealant depends on various factors (e.g. the amount and/or type of the at least one silicone-polyether copolymer, the types and/or amounts of any additional materials present in the sealant, etc.), and may be readily determined by one of skill in the art. The exact amount of the filler employed in a specific implementation of the sealant will also depend on whether more than one type of filler is utilized. Typically, where present, the sealant comprises the filler in an amount of from 0.1 to 95, alternatively from 1 to 60, alternatively from 1 to 20 wt. %, based on the weight of the sealant.

In particular embodiments, the sealant comprises a treating agent. The treating agent is not limited, and may be any treating agent suitable for use in treating (e.g. surface treating) an additive of the sealant, such as the filler and other additives (e.g. physical drying agents, flame retardants, pigments, and/or water release agents) which may be present in the sealant. More specifically, solid and/or particulate additives may be treated with the treating agent before being added to the sealant. Alternatively, or in addition, solid and/or particulate additives may be treated with the treating agent in situ. General examples of suitable treating agents include those comprising an alkoxysilane, an alkoxy-functional oligosiloxane, a cyclic polyorganosiloxane, a hydroxyl-functional oligosiloxane (e.g. dimethyl siloxane or methyl phenyl siloxane), a fatty acid (e.g. a stearate, such as calcium stearate), and the like, as well as combinations thereof. Specific examples of treating agents include alkylthiols, fatty acids, titanates, titanate coupling agents, zirconate coupling agents, and the like, as well as combinations thereof.

In some embodiments, the treating agent is or comprises an organosilicon filler treating agent. Examples of such organosilicon filler treating agents include compositions suitable for treating silica fillers, such as organochlorosilanes, organosiloxanes, organodisilazanes (e.g. hexaalkyl disilazane), and organoalkoxysilanes (e.g. $CH_3Si(OCH_3)_3$, $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, $C_6H_5CH_2CH_2Si(OCH_3)_3$, etc.), and the like. In these or other embodiments, the treating agent is or comprises an alkoxysilane having the formula (X): $R^{10}{}_A Si(OR^{11})_{4-A}$. In formula (X), subscript A is an integer of from 1 to 3, such as 1, 2, or 3, Each $R^{10}$ is an independently selected monovalent organic group, such as a monovalent hydrocarbon group having from 1 to 50 carbon atoms, alternatively from 8 to 30 carbon atoms, alternatively from 8 to 18 carbon atoms, alternatively from 1 to 5 carbon atoms. $R^{10}$ may be saturated or unsaturated, and branched or unbranched. Alternatively, $R^{10}$ may be saturated and unbranched. $R^{10}$ is exemplified by alkyl groups such as methyl, ethyl, hexyl, octyl, dodecyl, tetradecyl, hexadecyl, and octadecyl; alkenyl groups such as vinyl; and aromatic groups such as benzyl and phenylethyl. Each $R^{11}$ is an independently selected saturated hydrocarbon group having from 1 to 4 carbon atoms, alternatively from 1 to 2 carbon atoms. Specific examples of organosilicon filler treating agents also include hexyltrimethoxysilane, octyltriethoxysilane, decyltrimethoxysilane, dodecyltrimethoxysilane, tetradecyltrimethoxysilane, phenylethyltrimethoxysilane, octadecyltrimethoxysilane, octadecyltriethoxysilane, and combinations thereof.

In some embodiments, the treating agent is or comprises an alkoxy-functional oligosiloxanes. Examples of suitable alkoxy-functional oligosiloxanes include those having the general formula (XI): $(R^{12}O)_B Si(OSiR^{13}{}_2 R^{14})_{(4-B)}$. In formula (XI), subscript B is 1, 2 or 3. In specific embodiments, subscript B is 3. Each $R^{12}$ is an independently selected alkyl group. Each $R^{13}$ is an independently selected unsaturated monovalent hydrocarbon group having from 1 to 10 carbon atoms. Each $R^{14}$ is an independently selected unsaturated monovalent hydrocarbon group having at least 10 carbon atoms.

In certain embodiments, the treating agent is or comprises a polyorganosiloxane capable of hydrogen bonding. Such treating agents utilize multiple hydrogen bonds, which are clustered and/or dispersed, as a means to tether a compatibilization moiety to a surface of the sealant component to be treated (e.g. the filler). Suitable polyorganosiloxanes capable of hydrogen bonding have an average, per molecule, of at least one silicon-bonded group capable of hydrogen bonding, which is typically selected from organic groups having multiple hydroxyl functionalities, organic groups having at least one amino functional group, and combinations thereof. In other words, the polyorganosiloxane capable of hydrogen bonding typically utilizes hydrogen bonding as a primary mode of attachment to the filler. As such, in some embodiments, the polyorganosiloxane is incapable of forming covalent bonds with the filler. The polyorganosiloxane may be free of condensable silyl groups (e.g. silicon bonded alkoxy groups, silazanes, and silanols). Examples of suitable polyorganosiloxanes for use in or as the sealant include saccharide-siloxane polymers, amino-functional polyorganosiloxanes, and a combination thereof. In specific embodiments, the sealant comprises a polyorganosiloxane comprising a saccharide-siloxane polymer.

The amount of the treating agent present in the sealant depends on various factors (e.g. the amount and/or type of the at least one silicone-polyether copolymer, the types and/or amounts of any additional materials present in the sealant (such as those treated with the treating agent), etc.), and may be readily determined by one of skill in the art. Typically, the amount of the treating agent varies depending on the type of treating agent selected, the type and/or amount of particulates to be treated, and whether the particulates are treated before being added to the sealant or in situ. Typically, where present, the sealant comprises the treating agent in an amount of from 0.01 to 20, alternatively from 0.1 to 15, alternatively from 0.5 to 5 wt. %, based on the weight of the sealant.

In some embodiments, the sealant comprises a polymer additive, such as crosslinkers, chain extenders, plasticizers, end-blockers, and the like, or combinations thereof. In general, suitable polymer additives include compounds having functional groups that are reactive with functional groups present in the at least one silicone-polyether copolymer of the sealant, or with functional groups present in another polymer additive that has been reacted therewith. Certain polymer additives may be named based on an intended function (e.g. to cross-link, to chain-extend, to end-block, etc.). However, it is to be appreciated that there may be overlap in functions between types of polymer additives because certain polymer additives described herein may have more than one function as will be readily appreciated by one of skill in the art. For examples, suitable crosslinkers include those comprising a compound having an average, per molecule, of two or more substituents reactive with alkoxy groups present within the at least one silicone-polyether copolymer, and suitable chain extenders include those comprising a compound having an average, per molecule, of two substituents reactive with alkoxy groups present within the at least one silicone-polyether copolymer or with groups present within another polymer additive reacted with the at least one silicone-polyether copolymer. Accordingly, as is understood by those of skill in the art, various compounds may be used as a cross-linker and/or a chain extender. Similarly, various plasticizers, which are exemplified by the particular plasticizers described below, may also be interchangeably utilized in or as a crosslinker and/or a chain extender of the sealant.

In some embodiments, the sealant comprises a crosslinker. Some examples of suitable crosslinkers include silane crosslinkers having hydrolyzable groups, or partial or full hydrolysis products thereof. Examples of such silane crosslinkers include those including a silicon compound having the general formula (XII): $R^{15}{}_C Si(R^{16})_{(4-C)}$, where each $R^{15}$ is an independently selected monovalent hydrocarbon group, such as an alkyl group; each $R^{16}$ is a hydrolyzable substituent, for example, a halogen atom, an acetamido group, an acyloxy group such as acetoxy, an alkoxy group, an amido group, an amino group, an aminoxy group, a hydroxyl group, an oximo group, a ketoximo group, or a methylacetamido group; and subscript C is 0-3, such as 0, 1, 2, or 3. Typically, subscript C has an average value greater than 2. Alternatively, subscript C may have a value ranging from 3 to 4. Typically, each $R^{16}$ is independently selected from hydroxyl, alkoxy, acetoxy, amide, or oxime. Specific examples of suitable silane crosslinkers include methyldiacetoxymethoxysilane, methylacetoxydimethoxysilane, vinyldiacetoxymethoxysilane, vinylacetoxydimethoxysilane, methyldiacetoxyethoxysilane, methylacetoxydiethoxysilane, and combinations thereof.

In some embodiments, the crosslinker includes an acyloxysilane, an alkoxysilane, a ketoximosilane, an oximosilane, or the like, or combinations thereof.

Examples of suitable acetoxysilane crosslinkers include tetraacetoxysilanes, organotriacetoxysilanes, diorganodiacetoxysilanes, and combinations thereof. The acetoxysilane may contain alkyl groups such as methyl, ethyl, propyl, isopropyl, butyl, and tertiary butyl; alkenyl groups such as vinyl, allyl, or hexenyl; aryl groups such as phenyl, tolyl, or xylyl; aralkyl groups such as benzyl or 2-phenylethyl; and fluorinated alkyl groups such as 3,3,3-trifluoropropyl. Exemplary acetoxysilanes include tetraacetoxysilane, methyltriacetoxysilane, ethyltriacetoxysilane, vinyltriacetoxysilane, propyltriacetoxysilane, butyltriacetoxysilane, phenyltriacetoxysilane, octyltriacetoxysilane, dimethyldiacetoxysilane, phenylmethyldiacetoxysilane, vinylmethyldiacetoxysilane, diphenyl diacetoxysilane, tetraacetoxysilane, and combinations thereof. In some embodiments, the crosslinker comprises organotriacetoxysilanes, for example mixtures comprising methyltriacetoxysilane and ethyltriacetoxysilane.

Examples of suitable aminofunctional alkoxysilanes suitable for use in or as the crosslinker are exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, and combinations thereof.

Examples of suitable oximosilane crosslinkers include alkyltrioximosilanes such as methyltrioximosilane, ethyltrioximosilane, propyltrioximosilane, and butyltrioximosilane; alkoxytrioximosilanes such as methoxytrioximosilane, ethoxytrioximosilane, and propoxytrioximosilane; or alkenyltrioximosilanes such as propenyltrioximosilane or butenyltrioximosilane; alkenyloximosilanes such as vinyloximosilane; alkenylalkyldioximosilanes such as vinyl methyl dioximosilane, vinyl ethyldioximosilane, vinyl methyldioximosilane, or vinylethyldioximosilane; or combinations thereof.

Examples of suitable ketoximosilanes crosslinkers include methyl tris(dimethylketoximo)silane, methyl tris(methylethylketoximo)silane, methyl tris(methylpropylketoximo)silane, methyl tris(methylisobutylketoximo)silane, ethyl tris(dimethylketoximo)silane, ethyl tris(methylethylketoximo)silane, ethyl tris(methylpropylketoximo)silane, ethyl tris(methylisobutylketoximo)silane, vinyl tris(dimethylketoximo)silane, vinyl tris(methylethylketoximo)silane, vinyl tris(methylpropylketoximo)silane, vinyl tris(methylisobutylketoximo)silane, tetrakis(dimethylketoximo)silane, tetrakis(methylethylketoximo)silane, tetrakis(methylpropylketoximo)silane, tetrakis(methylisobutylketoximo)silane, methylbis(dimethylketoximo)silane, methylbis(cyclohexylketoximo)silane, triethoxy(ethylmethylketoxime)silane, diethoxydi(ethylmethylketoxime)silane, ethoxytri(ethylmethylketoxime)silane, methylvinylbis(methylisobutylketoximo)silane, or a combination thereof.

In certain embodiments, the crosslinker comprises an alkoxysilane exemplified by a dialkoxysilane, such as a dialkyldialkoxysilane; a trialkoxysilane, such as an alkyltrialkoxysilane; a tetraalkoxysilane; partial or full hydrolysis products thereof; or a combination thereof. Examples of suitable trialkoxysilanes include methyltrimethoxysilane, vinyltrimethoxysilane, methyltriethoxysilane, ethyltrimethoxysilane, ethyltriethoxysilane, isobutyltrimethoxysilane, isobutyltriethoxysilane, and combinations thereof. Examples of suitable tetraalkoxysilanes include tetraethoxysilane. In specific embodiments, the crosslinker comprises, alternatively is, methyltrimethoxysilane.

In certain embodiments, the crosslinker is polymeric. For example, the crosslinker may comprise a dipodal silane such as bis(triethoxysilyl)hexane), 1,4-bis[trimethoxysilyl(ethyl)]benzene, bis[3-(triethoxysilyl)propyl]tetrasulfide, bis(trimethoxysilyl)hexane), bis(triethoxysilyl)ethane, bis(trimethoxysilyl)ethane, and combinations thereof. In these or other embodiments, the crosslinker may be one single crosslinker or a combination comprising two or more crosslinkers that differ from one another, e.g. based on hydrolyzable substituents and other organic groups bonded to silicon, and, when a polymeric crosslinker is used, siloxane units, structure, molecular weight, sequence, etc.

The amount of the crosslinker present in the sealant depends on various factors (e.g. the amount and/or type of the at least one silicone-polyether copolymer, the types and/or amounts of any additional materials present in the sealant (such as other polymer additives), the type of crosslinker utilized, etc.), and may be readily determined by one of skill in the art. In general, where present, the sealant comprises the crosslinker in an amount of from 0.5 to 15, alternatively from 1 to 10, alternatively from 3 to 10 wt. %, based on the weight of the at least one silicone-polyether copolymer.

In some embodiments, the sealant comprises a plasticizer. Examples of suitable plasticizers include organic plasticizers, such as those comprising a carboxylic acid ester (e.g. esters), a phthalate (e.g. phthalates), a carboxylate (e.g. carboxylates), an adipate (e.g. adipates), or a combination thereof. Specific examples of suitable organic plasticizers include bis(2-ethylhexyl)terephthalate, bis(2-ethylhexyl)-1,4-benzenedicarboxylate, 2-ethylhexyl methyl-1,4-benzenedicarboxylate, 1,2 cyclohexanedicarboxylic acid, dinonyl ester (branched and linear), bis(2-propylheptyl) phthalate, diisononyl adipate, and combinations thereof.

In certain embodiments, the plasticizer is an ester having an average, per molecule, of at least one group of formula:

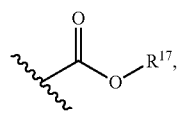

where $R^{17}$ represents a hydrogen atom or a monovalent organic group (e.g. a branched or linear monovalent hydrocarbon group, such as an alkyl group of 4 to 15 carbon atoms, alternatively 9 to 12 carbon atoms). In these or other embodiments, the plasticizer has an average, per molecule, of at least two groups of the formula above each bonded to carbon atoms in a cyclic hydrocarbon. In such instances, the plasticizer may have general formula:

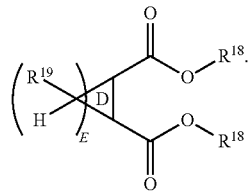

In this formula, D is a carbocyclic group having 3 or more carbon atoms, alternatively 3 to 15 carbon atoms, which may be unsaturated, saturated, or aromatic. Subscript E is from 1 to 12. Each $R^{18}$ is independently a branched or linear monovalent hydrocarbon group, such as an alkyl group of 4 to 15 carbon atoms (e.g. an alkyl group such as methyl, ethyl, butyl, etc.). Each $R^{19}$ is independently a hydrogen atom or a branched or linear, substituted or unsubstituted, monovalent organic group. For example, in some embodiments, at least one $R^{19}$ is a moiety comprising an ester functional group.

In specific embodiments, the sealant comprises a polymeric plasticizer. Examples of polymeric plasticizers include alkenyl polymers (e.g. those obtained by polymerizing vinyl or allyl monomers via various methods); polyalkylene glycol esters (e.g. diethylene glycol dibenzoates, triethylene glycols, dibenzoate pentaerythritol esters, etc.); polyester plasticizers (e.g. those obtained from dibasic acids such as sebacic acid, adipic acid, azelaic acid, phthalic acid, etc. and dihydric alcohols such as ethylene glycol, diethylene glycol, triethylene glycol, propylene glycol, dipropylene glycol, etc.); polyethers including polyether polyols each having a molecular weight of not less than 500 (e.g. polyethylene glycols, polypropylene glycols, polytetramethylene glycols, etc.); polystyrenes (e.g. polystyrene, poly-alpha-methylstyrene, etc.); polybutenes and polybutadienes (e.g. polyisobutylene, butadiene acrylonitrile, etc.); and polychloroprenes. In various embodiments, a low molecular weight plasticizer and a higher molecular weight polymeric plasticizer may present in the sealant in combination.

Specific plasticizers are known in the art and are commercially available. Such plasticizers may be present in the sealant alone or in combination. For example, the plasticizer may comprise a phthalate, such as: a dialkyl phthalate such as dibutyl phthalate (Eastman™ DBP Plasticizer), diheptyl phthalate, diisononyl phthalate, di(2-ethylhexyl) phthalate, or diisodecyl phthalate (DIDP), bis(2-propylheptyl) phthalate (BASF Palatinol® DPHP), di(2-ethylhexyl) phthalate (Eastman™ DOP Plasticizer), dimethyl phthalate (Eastman™ DMP Plasticizer); diethyl phthalate (Eastman™ DMP Plasticizer); butyl benzyl phthalate, and bis(2-ethylhexyl)terephthalate (Eastman™ 425 Plasticizer); a dicarboxylate such as Benzyl, C7-C9 linear and branched alkyl esters, 1, 2, benzene dicarboxylic acid (Ferro SANTICIZER® 261A), 1,2,4-benzenetricarboxylic acid (BASF Palatinol® TOTM-I), bis(2-ethylhexyl)-1,4-benzenedicarboxylate (Eastman™ 168 Plasticizer); 2-ethylhexyl methyl-1,4-benzenedicarboxylate; 1,2 cyclohexanedicarboxylic acid, dinonyl ester, branched and linear (BASF Hexamoll® DINCH); diisononyl adipate; trimellitates such as trioctyl trimellitate (Eastman™ TOTM Plasticizer); triethylene glycol bis(2-ethylhexanoate) (Eastman™ TEG-EH Plasticizer); triacetin (Eastman™ Triacetin); nonaromatic dibasic acid esters such as dioctyl adipate, bis(2-ethylhexyl)adipate (Eastman™ DOA Plasticizer and Eastman™ DOA Plasticizer, Kosher), di-2-ethylhexyladipate (BASF Plastomoll® DOA), dioctyl sebacate, dibutyl sebacate and diisodecyl succinate; aliphatic esters such as butyl oleate and methyl acetyl recinolate; phosphates such as tricresyl phosphate and tributyl phosphate; chlorinated paraffins; hydrocarbon oils such as alkyldiphenyls and partially hydrogenated terphenyls; process oils; epoxy plasticizers such as epoxidized soybean oil and benzyl epoxystearate; tris(2-ethylhexyl) ester; a fatty acid ester; and a combination thereof. Examples of other suitable plasticizers and their commercial sources include BASF Palamoll® 652 and Eastman 168 Xtreme™ Plasticizer.

The amount of the plasticizer present in the sealant depends on various factors (e.g. the amount and/or type of the at least one silicone-polyether copolymer, the types and/or amounts of any additional materials present in the sealant (such as other polymer additives), the type of crosslinker utilized, etc.), and may be readily determined by one of skill in the art. In general, where present, the sealant comprises the plasticizer in an amount of from 5 to 150 parts by weight based on the combined weights of all components in the sealant. In specific embodiments, the sealant comprises the plasticizer in an amount of from 0.1 to 10 wt. % based on the total weight of the sealant.

In some embodiments, the sealant comprises an extender. Examples of suitable extenders include non-functional polyorganosiloxanes, such as those comprising difunctional units of the formula $R^{20}{}_2SiO_{2/2}$ and terminal units of the formula $R^{21}{}_3SiD'$-, where each $R^{20}$ and each $R^{21}$ are independently a monovalent organic group such as a monovalent hydrocarbon group exemplified by alkyl such as methyl, ethyl, propyl, and butyl; alkenyl such as vinyl, allyl, and hexenyl; aryl such as phenyl, tolyl, xylyl, and naphthyl; and aralkyl groups such as phenylethyl; and D' is an oxygen atom or a divalent group. Non-functional polyorganosiloxanes are known in the art and are commercially available. Suitable non-functional polyorganosiloxanes are exemplified by, but not limited to, polydimethylsiloxanes. Such polydimethylsiloxanes include DOWSIL® 200 Fluids, which are commercially available from Dow Silicones Corporation of Midland, Mich., U.S.A. and may have viscosity ranging from $5\times10^{-5}$ to 0.1, alternatively from $5\times10^{-5}$ to 0.05, and alternatively from 0.0125 to 0.06, m²/s. The amount of the extender present in the sealant depends on various factors (e.g. the amount and/or type of the at least one silicone-polyether copolymer, the types and/or amounts of any additional materials present in the sealant (such as other polymer additives), the type of crosslinker utilized, etc.), and may be readily determined by one of skill in the art. In general, where present, the sealant comprises the extender in an amount of from 0.1 to 10 wt. % based on the total weight of the sealant.

In some embodiments, the sealant comprises an end-blocker. Suitable end-blockers comprise an M unit, i.e., a siloxane unit of formula $R^{22}{}_3SiO_{1/2}$, where each $R^{22}$ independently represents a monovalent organic group, such as a monovalent hydrocarbon group. General examples of such end-blockers include those comprising a polyorganosiloxane (e.g. a polydiorganosiloxane, such as a polydimethylsiloxane) that is end-blocked at one terminus by a triorganosilyl group, e.g. $(CH_3)_3SiO$—, and at another terminus by a hydroxyl group. Other examples of suitable end-blockers include polydiorganosiloxanes having both hydroxyl end groups and triorganosilyl end groups, such as those having more than 50%, alternatively more than 75%, of the total end groups as hydroxyl groups. The amount of triorganosilyl group present in such end-blockers may vary, and is typically used to regulate the modulus of the reaction product prepared by condensation reaction of the sealant. Without wishing to be bound by theory, it is thought that higher concentrations of triorganosilyl end groups may provide a lower modulus in certain cured products. In some embodiments, the end-blocker of the sealant comprises a single end-blocking compound. However, in other embodiments, the end-blocker of sealant comprises two or more different end-blocking compounds that differ from one another, e.g. by way of properties including structure, viscosity, average molecular weight, polymer units, sequence, etc., or combinations thereof. The amount of the end-blocker present in the sealant depends on various factors (e.g. the amount and/or type of the at least one silicone-polyether copolymer, the types and/or amounts of any additional materials present in the sealant (such as other polymer additives), the type of end-blocker utilized, etc.), and may be readily determined by one of skill in the art. In general, where present, the sealant comprises the end-blocker in an amount of from 0 to 50, alternatively from 0 to 30, alternatively from 0 to 15, wt. %, based on the total weight of the at least one silicone-polyether copolymer.

In certain embodiments, the sealant comprises a surface modifier. Suitable surface modifiers include adhesion promoters, release agents, and the like, as well as combinations thereof. Typically, the surface modifier is utilized to change the appearance of the surface of a reaction product of the sealant. For example, the surface modifier may be used to increase gloss of the surface of such a reaction product. Specific examples of suitable surface modifiers include polydiorganosiloxanes with alkyl and aryl groups. For example, DOWSIL® 550 Fluid is a trimethylsiloxy-terminated poly(dimethyl/methylphenyl)siloxane with a viscosity of 0.000125 m²/s that is commercially available from Dow Silicones Corporation. These and other examples of suitable surface modifiers include natural oils (e.g. those obtained from a plant or animal source), such as linseed oil, tung oil, soybean oil, castor oil, fish oil, hempseed oil, cottonseed oil, oiticica oil, rapeseed oil, and the like, as well as combinations thereof.

In some embodiments, the surface modifier is an adhesion promoter. Suitable adhesion promoters may comprise a hydrocarbonoxysilane such as an alkoxysilane, a combination of an alkoxysilane and a hydroxy-functional polyorganosiloxane, an amino functional silane, an epoxy functional silane, a mercaptofunctional silane, or a combination thereof. Adhesion promoters are known in the art and may comprise silanes having the formula $R^{23}{}_FR^{24}{}_GSi(OR^{25})_{4-(F+G)}$ where each $R^{23}$ is independently a monovalent organic group having at least 3 carbon atoms; $R^{24}$ contains at least one SiC bonded substituent having an adhesion-promoting group, such as amino, epoxy, mercapto or acrylate groups; each $R^{25}$ is independently a monovalent organic group (e.g. methyl, ethyl, propyl, butyl, etc.); subscript F has a value ranging from 0 to 2; subscript G is either 1 or 2; and the sum of (F+G) is not greater than 3. In certain embodiments, the adhesion promoter comprises a partial condensate of the above silane. In these or other embodiments, the adhesion promoter comprises a combination of an alkoxysilane and a hydroxy-functional polyorganosiloxane.

In some embodiments, the adhesion promoter comprises an unsaturated or epoxy-functional compound. In such embodiments, the adhesion promoter may be or comprise an unsaturated or epoxy-functional alkoxysilane such as those having the formula (XIII): $R^{26}{}_H Si(OR^{27})_{(4-H)}$, where subscript H is 1, 2, or 3, alternatively subscript H is 1. Each $R^{26}$ is independently a monovalent organic group with the proviso that at least one $R^{26}$ is an unsaturated organic group or an epoxy-functional organic group. Epoxy-functional organic groups for $R^{26}$ are exemplified by 3-glycidoxypropyl and (epoxycyclohexyl)ethyl. Unsaturated organic groups for $R^{26}$ are exemplified by 3-methacryloyloxypropyl, 3-acryloyloxypropyl, and unsaturated monovalent hydrocarbon groups such as vinyl, allyl, hexenyl, undecylenyl. Each $R^{27}$ is independently a saturated hydrocarbon group of 1 to 4 carbon atoms, alternatively 1 to 2 carbon atoms. $R^{27}$ is exemplified by methyl, ethyl, propyl, and butyl.

Specific examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof.

In some embodiments, the adhesion promoter comprises an epoxy-functional siloxane, such as a reaction product of a hydroxy-terminated polyorganosiloxane with an epoxy-functional alkoxysilane (e.g. such as one of those described above), or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

In certain embodiments, the adhesion promoter comprises an aminofunctional silane, such as an aminofunctional alkoxysilane exemplified by $H_2N(CH_2)_2Si(OCH_3)_3$, $H_2N(CH_2)_2Si(OCH_2CH_3)_3$, $H_2N(CH_2)_3Si(OCH_3)_3$, $H_2N(CH_2)_3Si(OCH_2CH_3)_3$, $CH_3NH(CH_2)_3Si(OCH_3)_3$, $CH_3NH(CH_2)_3Si(OCH_2CH_3)_3$, $CH_3NH(CH_2)_5Si(OCH_3)_3$, $CH_3NH(CH_2)_5Si(OCH_2CH_3)_3$, $H_2N(CH_2)_2NH(CH_2)_3Si(OCH_3)_3$, $H_2N(CH_2)_2NH(CH_2)_3Si(OCH_2CH_3)_3$, $CH_3NH(CH_2)_2NH(CH_2)_3Si(OCH_3)_3$, $CH_3NH(CH_2)_2NH(CH_2)_3Si(OCH_2CH_3)_3$, $C_4H_9NH(CH_2)_2NH(CH_2)_3Si(OCH_3)_3$, $C_4H_9NH(CH_2)_2NH(CH_2)_3Si(OCH_2CH_3)_3$, $H_2N(CH_2)_2SiCH_3(OCH_3)_2$, $H_2N(CH_2)_2SiCH_3(OCH_2CH_3)_2$, $H_2N(CH_2)_3SiCH_3(OCH_3)_2$, $H_2N(CH_2)_3SiCH_3(OCH_2CH_3)_2$, $CH_3NH(CH_2)_3SiCH_3(OCH_3)_2$, $CH_3NH(CH_2)_3SiCH_3(OCH_2CH_3)_2$, $CH_3NH(CH_2)_5SiCH_3(OCH_3)_2$, $CH_3NH(CH_2)_5SiCH_3(OCH_2CH_3)_2$, $H_2N(CH_2)_2NH(CH_2)_3SiCH_3(OCH_3)_2$, $H_2N(CH_2)_2NH(CH_2)_3SiCH_3(OCH_2CH_3)_2$, $CH_3NH(CH_2)_2NH(CH_2)_3SiCH_3(OCH_3)_2$, $CH_3NH(CH_2)_2NH(CH_2)_3SiCH_3(OCH_2CH_3)_2$, $C_4H_9NH(CH_2)_2NH(CH_2)_3SiCH_3(OCH_3)_2$, $C_4H_9NH(CH_2)_2NH(CH_2)_3SiCH_3(OCH_2CH_3)_2$, N-(3-(trimethoxysilyl)propyl)ethylenediamine, and the like, as well as combinations thereof. In these or other embodiments, the adhesion promoter comprises a mercaptofunctional alkoxysilane, such as 3-mercaptopropyltrimethoxysilane or 3-mercaptopropyltriethoxysilane.

Additional examples of surface modifiers include adhesion promoters which are the reaction product of an epoxy-alkylalkoxysilane, such as 3-glycidoxypropyltrimethoxysilane, and an amino-substituted alkoxysilane, such as 3-aminopropyltrimethoxysilane, optionally with an alkylalkoxysilane, such as methyltrimethoxysilane.

In some embodiments, the surface modifier comprises, alternatively is, a release agent. Suitable release agents are exemplified by fluorinated compounds, such as fluoro-functional silicones, or fluoro-functional organic compounds. In specific embodiments, the sealant comprises multiple surface modifiers, such as one or more adhesion promoters, one or more release agents, one or more natural oils, or combinations thereof.

The amount of the surface modifier present in the sealant depends on various factors (e.g. the amount and/or type of the at least one silicone-polyether copolymer, the types and/or amounts of any additional materials present in the sealant, curing conditions to which the sealant is intended to be exposed, etc.), and may be readily determined by one of skill in the art. In general, where present, the sealant comprises the surface modifier in an amount of from 0.01 to 50, alternatively from 0.01 to 10, alternatively from 0.01 to 5 parts by weight, based on the combined weights of all components in the sealant.

In certain embodiments, the sealant comprises a drying agent, such as physical drying agents (e.g. adsorbents), chemical drying agents, etc. In general, the drying agent binds water and low-molecular weight alcohol from various sources. For example, the drying agent may bind by-products of a condensation reaction involving the at least one silicone-polyether copolymer, such as water and alcohols. Physical drying agents typically trap and/or adsorb such water and/or by-products, where chemical drying agents typically binding the water and/or other by-products by chemical means (e.g. via covalent bonding). Examples of suitable drying agents for use in the sealant include adsorbents, such as those comprising inorganic particulates. Such adsorbents typically have a particle size of 10 micrometers or less, alternatively 5 micrometers or less, and an average pore size sufficient to adsorb water and low-molecular weight alcohol alcohols (e.g. an average pore size of 10 Å (Angstroms) or less, alternatively 5 Å or less, alternatively 3 Å or less). Specific examples of such adsorbents include zeolites (e.g. chabasite, mordenite, and analcite) and molecular sieves comprising alkali metal alumino silicates, silica gel, silica-magnesia gel, activated carbon, activated alumina, calcium oxide, and combinations thereof. Examples of commercially available drying agents include dry molecular sieves, such as 3 Å (Angstrom) molecular sieves sold under the trademark SYLOSIV® by Grace Davidson and under the trade name PURMOL by Zeochem of Louisville, Ky., U.S.A., and 4 Å molecular sieves sold under the trade name Doucil zeolite 4A by Ineos Silicas of Warrington, England. Other examples of suitable drying agents include: MOLSIV ADSORBENT TYPE 13X, 3A, 4A, and 5A molecular sieves, all of which are commercially available from UOP of Illinois, U.S.A.; SILIPORITE NK 30AP and 65xP molecular sieves from Atofina of Philadelphia, Pa., U.S.A.; and molecular sieves available from W.R. Grace of Maryland, U.S.A. under various names. Examples of chemical drying agents include silanes, such as those described above with respect to the crosslinker. For example, alkoxysilanes suitable as drying agents include vinyltrimethoxysilane, vinyltriethoxysilane, and combinations thereof. As understood by those of skill in the art, the chemical drying agent may be added to the sealant, or to a part of the sealant (e.g. where the sealant is a multiple-part composition) to keep the sealant or part thereof free from water. As such, the drying agent may be added to a part (e.g. a dry part) of the sealant prior to the sealant being formed, thereby rendering the part shelf stable. Alternatively, or additionally, the drying agent may keep the sealant free from water after formulation (e.g. after the parts of the sealant are combined/mixed together). The amount of the drying agent present in the sealant depends on various factors (e.g. the amount and/or type of the at least one silicone-polyether copolymer, the types and/or amounts of any additional materials present in the sealant, curing conditions to which the sealant is intended to be exposed, etc.), and may be readily determined by one of skill in the art. In general, where present, the sealant comprises the drying agent in an amount of from 0.1 to 5 parts by weight, based on the combined weights of all components in the sealant.

In some embodiments, the sealant comprises a biocide. General examples of suitable biocides include fungicides, herbicides, pesticides, antimicrobials, and the like, as well as combinations thereof. For example, in certain embodiments, the biocide comprises, alternatively is, a fungicide. Specific examples of the fungicide include N-substituted benzimidazole carbamates and benzimidazolyl carbamates, such as methyl 2-benzimidazolylcarbamate, ethyl 2-benzimidazolylcarbamate, isopropyl 2-benzimidazolylcarbamate, methyl N-{2-[1-(N,N-dimethylcarbamoyl)benzimidazolyl]}carbamate, methyl N-{2-[1-(N,N-dimethylcarbamoyl)-6-methylbenzimidazolyl]}carbamate, methyl N-{2-[1-(N,N-dimethylcarbamoyl)-5-methylbenzimidazolyl]}carbamate, methyl N-{2-[1-(N-methylcarbamoyl)benzimidazolyl]}carbamate, methyl N-{2-[1-(N-methylcarbamoyl)-6-methylbenzimidazolyl]}carbamate, methyl N-{2-[1-(N-methylcarbamoyl)-5-methylbenzimidazolyl]}carbamate, ethyl N-{2-[1-(N,N-dimethylcarbamoyl)benzimidazolyl]}carbamate, ethyl N-{2-[2-(N-methylcarbamoyl)benzimidazolyl]}carbamate, ethyl N-{2-[1-(N,N-dimethylcarbamoyl)-6-methylbenzimidazolyl]}carbamate, ethyl N-{2-[1-(N-methylcarbamoyl)-6-methylbenzimidazolyl]}carbamate, isopropyl N-{2-[1-(N,N-dimethylcarbamoyl)benzimidazolyl]}carbamate, isopropyl N-{2-[1-(N-methylcarbamoyl)benzimidazolyl]}carbamate, methyl N-{2-[1-(N-propylcarbamoyl)benzimidazolyl]}carbamate, methyl N-{2-[1-(N-butylcarbamoyl)benzimidazolyl]}carbamate, methoxyethyl N-{2-[1-(N-propylcarbamoyl)benzimidazolyl]}carbamate, methoxyethyl N-{2-[1-(N-butylcarbamoyl)benzimidazolyl]}carbamate, ethoxyethyl N-{2-[1-(N-propylcarbamoyl)benzimidazolyl]}carbamate, ethoxyethyl N-{2-[1-(N-butylcarbamoyl)benzimidazolyl]}carbamate, methyl N-{1-(N,N-dimethylcarbamoyloxy)benzimidazolyl]}carbamate, methyl N-{2-[N-methylcarbamoyloxy)benzimidazolyl]}carbamate, methyl N-{2-[1-(N-butylcarbamoyloxy)benzoimidazolyl]}carbamate, ethoxyethyl N-{2-[1-(N-propylcarbamoyl)benzimidazolyl]}carbamate, ethoxyethyl N-{2-[1-(N-butylcarbamoyloxy)benzoimidazolyl]}carbamate, methyl N-{2-[1-(N,N-dimethylcarbamoyl)-6-chlorobenzimidazolyl]}carbamate, and methyl N-{2-[1-(N,N-dimethylcarbamoyl)-6-nitrobenzimidazolyl]}carbamate; 10,10'-oxybisphenoxarsine (trade name: Vinyzene, OBPA); di-iodomethyl-para-tolylsulfone; benzothiophene-2-cyclohexylcarboxamide-S,S-dioxide; N-(fluordichloridemethylthio)phthalimide (trade names: Fluor-Folper, Preventol A3); methyl-benzimideazol-2-ylcarbamate (trade names: Carbendazim, Preventol BCM); Zinc-bis(2-pyridylthio-1-oxide); zinc pyrithione; 2-(4-thiazolyl)-benzimidazol; N-phenyl-iodpropargylcarbamate; N-octyl-4-isothiazolin-3-on; 4,5-dichloride-2-n-octyl-4-isothiazolin-3-on; N-butyl-1,2-benzisothiazolin-3-on; triazolyl-compounds, such as tebuconazol; and the like, as well as combinations thereof. In particular embodiments, such fungicides are utilized in combination with one or more inorganic materials, such as mineral (e.g. zeolites), metals (e.g. copper, silver, platinum, etc.), and combinations thereof.

In particular embodiments, the biocide comprises, alternatively is, an herbicide. Specific examples of the herbicide include amide herbicides such as allidochlor N,N-diallyl-2-chloroacetamide; CDEA 2-chloro-N,N-diethylacetamide; etnipromid (RS)-2-[5-(2,4-dichlorophenoxy)-2-nitrophenoxy]-N-ethylpropionamide; anilide herbicides such as cisanilide cis-2,5-dimethylpyrrolidine-1-carboxanilide; flufenacet 4'-fluoro-N-isopropyl-2-[5-(trifluoromethyl)-1,3,4-thiadiazol-2-yloxy]acetanilide; naproanilide (RS)-α-2-naphthoxypropionanilide; arylalanine herbicides such as benzoylprop N-benzoyl-N-(3,4-dichlorophenyl)-DL-alanine; flamprop-M N-benzoyl-N-(3-chloro-4-fluorophenyl)-D-alanine; chloroacetanilide herbicides such as butachlor N-butoxy methyl-2-chloro-2',6'-diethylacetanilide; metazachlor 2-chloro-N-(pyrazol-1-ylmethyl)acet-2',6'-xylidide; prynachlor (RS)-2-chloro-N-(1-methylprop-2-ynyl)acetanilide; sulphonanilide herbicides such as cloransulam 3-chloro-2-(5-ethoxy-7-fluoro[1,2,4]triazolo[1,5-c]pyrimidin-2-ylsulphonamido)benzoic acid; metosulam 2',6'-dichloro-5,7-dimethoxy-3'-methyl[1,2,4]triazolo[1,5-a]pyrimidine-2-sulphonanilide; antibiotic herbicides such as bilanafos 4-[hydroxy(methyl)phosphinoyl]-L-homoalanyl-L-alanyl-L-alanine; benzoic acid herbicides such as chloramben 3-amino-2,5-dichlorobenzoic acid; 2,3,6-TBA 2,3,6-trichlorobenzoic acid; pyrimidinyloxybenzoic acid herbicides such as bispyribac 2,6-bis(4,6-dimethoxypyrimidin-2-yloxy)benzoic acid; pyrimidinylthiobenzoic acid herbicides such as pyrithiobac 2-chloro-6-(4,6-dimethoxypyrimidin-2-ylthio)benzoic acid; phthalic acid herbicides such as chlorthal tetrachloroterephthalic acid; picolinic acid herbicides such as aminopyralid 4-amino-3,6-dichloropyridine-2-carboxylic acid; quinolinecarboxylic acid herbicides such as quinclorac 3,7-dichloroquinoline-8-carboxylic acid; arsenical herbicides such as CMA calcium bis(hydrogen methylarsonate); MAMA ammonium hydrogen methylarsonate; sodium arsenite; benzoylcyclohexanedione herbicides such as mesotrione 2-(4-mesyl-2-nitrobenzoyl)cyclohexane-1,3-dione; benzofuranyl alkylsulphonate herbicides such as benfuresate 2,3-dihydro-3,3-dimethylbenzofuran-5-yl ethanesulphonate; carbamate herbicides such as carboxazole methyl 5-tert-butyl-1,2-oxazol-3-ylcarbamate; fenasulam methyl 4-[2-(4-chloro-o-tolyloxy)acetamido]phenylsulphonylcarbamate; carbanilate herbicides such as BCPC (RS)-sec-butyl 3-chlorocarbanilate; desmedipham ethyl 3-phenylcarbamoyloxyphenylcarbamate; swep methyl 3,4-dichlorocarbanilate; cyclohexene oxime herbicides such as butroxydim (RS)-(EZ)-5-(3-butyryl-2,4,6-trimethylphenyl)-2-(1-ethoxyiminopropyl)-3-hydroxycyclohex-2-en-1-one; tepraloxydim (RS)-(EZ)-2-{1-[(2E)-3-chloroallyloxyimino]propyl}-3-hydroxy-5-perhydropyran-4-ylcyclohex-2-en-1-one; cyclopropylisoxazole herbicides such as isoxachlortole 4-chloro-2-mesylphenyl 5-cyclopropyl-1,2-oxazol-4-yl ketone; dicarboximide herbicides such as flumezin 2-methyl-4-(α,α,α-trifluoro-m-tolyl)-1,2,4-oxadiazinane-3,5-dione; dinitroaniline herbicides such as ethalfluralin N-ethyl-α,α,α-trifluoro-N-(2-methylallyl)-2,6-dinitro-p-toluidine; prodiamine 5-dipropylamino-α,α,α-trifluoro-4,6-dinitro-o-toluidine; dinitrophenol herbicides such as dinoprop 4,6-dinitro-o-cymen-3-ol; etinofen α-ethoxy-4,6-dinitro-o-cresol; diphenyl ether herbicides such as ethoxyfen O-[2-chloro-5-(2-chloro-α,α,α-trifluoro-p-tolyloxy)benzoyl]-L-lactic acid; nitrophenyl ether herbicides such as aclonifen 2-chloro-6-nitro-3-phenoxyaniline; nitrofen 2,4-dichlorophenyl 4-nitrophenyl ether; dithiocarbamate herbicides such as dazomet 3,5-dimethyl-1,3,5-thiadiazinane-2-thione; halogenated aliphatic herbicides such as dalapon 2,2-dichloropropionic acid; chloroacetic acid; imidazolinone herbicides such as imazapyr (RS)-2-(4-isopropyl-4-methyl-5-oxo-2-imidazolin-2-yl)nicotinic acid; inorganic herbicides such as disodium tetraborate decahydrate; sodium azide; nitrile herbicides such as chloroxynil 3,5-dichloro-4-hydroxybenzonitrile; ioxynil 4-hydroxy-3,5-diiodobenzonitrile; organophosphorus herbicides such as anilofos S-4-chloro-N-isopropylcarbaniloylmethyl O,O-dimethyl phosphorodithioate; glufosinate 4-[hydroxy(methyl) phosphinoyl]-DL-homoalanine; phenoxy herbicides such as clomeprop (RS)-2-(2,4-dichloro-m-tolyloxy)propionanilide; fenteracol 2-(2,4,5-trichlorophenoxy)ethanol; phenoxyacetic herbicides such as MCPA (4-chloro-2-methylphenoxy)acetic acid; phenoxybutyric herbicides such as MCPB 4-(4-chloro-o-tolyloxy)butyric acid; phenoxypropionic herbicides such as fenoprop (RS)-2-(2,4,5-trichlorophenoxy) propionic acid; aryloxyphenoxypropionic herbicides such as isoxapyrifop (RS)-2-[2-[4-(3,5-dichloro-2-pyridyloxy)phenoxy]propionyl]isoxazolidine; phenylenediamine herbicides such as dinitramine N1,N1-diethyl-2,6-dinitro-4-trifluoromethyl-m-phenylenediamine, pyrazolyloxyacetophenone herbicides such as pyrazoxyfen 2-[4-(2,4-dichlorobenzoyl)-1,3-dimethylpyrazol-5-yloxy] acetophenone; pyrazolylphenyl herbicides such as pyraflufen 2-chloro-5-(4-chloro-5-difluoromethoxy-1-methylpyrazol-3-yl)-4-fluorophenoxyacetic acid; pyridazine herbicides such as pyridafol 6-chloro-3-phenylpyridazin-4-ol; pyridazinone herbicides such as chloridazon 5-amino-4-chloro-2-phenylpyridazin-3(2H)-one; oxapyrazon 5-bromo-1,6-dihydro-6-oxo-1-phenylpyridazin-4-yloxamic acid; pyridine herbicides such as fluoroxypyr 4-amino-3,5-dichloro-6-fluoro-2-pyridyloxyacetic acid; thiazopyr methyl 2-difluoromethyl-5-(4,5-dihydro-1,3-thiazol-2-yl)-4-isobutyl-6-trifluoromethylnicotinate; pyrimidinediamine herbicides such as iprymidam 6-chloro-N4-isopropylpyrimidine-2,4-diamine; quaternary ammonium herbicides such as diethamquat 1,1'-bis(diethylcarbamoylmethyl)-4,4'-bipyridinium; paraquat 1,1'-dimethyl-4,4'-bipyridinium; thiocarbamate herbicides such as cycloate S-ethyl cyclohexyl(ethyl)thiocarbamate; tiocarbazil S-benzyl di-sec-butylthiocarbamate; thiocarbonate herbicides such as EXD O,O-diethyl dithiobis(thioformate); thiourea herbicides such as methiuron 1,1-dimethyl-3-m-tolyl-2-thiourea; triazine herbicides such as triaziflam (RS)—N-[2-(3,5-dimethylphenoxy)-1-methylethyl]-6-(1-fluoro-1-methylethyl)-1,3,5-triazine-2,4-diamine; chlorotriazine herbicides such as cyprazine 6-chloro-N2-cyclopropyl-N4-isopropyl-1,3,5-triazine-2,4-diamine; propazine 6-chloro-A2,N4-di-isopropyl-1,3,5-triazine-2,4-diamine; methoxytriazine herbicides such as prometon N2,N4-di-isopropyl-6-methoxy-1,3,5-triazine-2,4-diamine; methylthiotriazine herbicides such as cyanatryn 2-(4-ethylamino-6-methylthio-1,3,5-triazin-2-ylamino)-2-methylpropionitrile; triazinone herbicides such as hexazinone 3-cyclohexyl-6-dimethylamino-1-methyl-1,3,5-triazine-2,4(1H,3H)-dione; triazole herbicides such as epronaz N-ethyl-N-propyl-3-propylsulphonyl-1H-1,2,4-triazole-1-carboxamide; triazolone herbicides such as carfentrazone (RS)-2-chloro-3-{2-chloro-5-[4-(difluoromethyl)-4,5-dihydro-3-methyl-5-oxo-1H-1,2,4-triazol-1-yl]-4-fluorophenyl}propionic acid; triazolopyrimidine herbicides such as florasulam 2',6',8-trifluoro-5-methoxy[1,2,4]triazolo [1,5-c]pyrimidine-2-sulphonanilide; uracil herbicides such as flupropacil isopropyl 2-chloro-5-(1,2,3,6-tetrahydro-3-methyl-2,6-dioxo-4-trifluoromethylpyrimidin-1-yl)benzoate; urea herbicides such as cycluron 3-cyclo-octyl-1,1-dimethylurea; monisouron 1-(5-tert-butyl-1,2-oxazol-3-yl)-3-methylurea; phenylurea herbicides such as chloroxuron 3-[4-(4-chlorophenoxy)phenyl]-1,1-dimethylurea; siduron 1-(2-methylcyclohexyl)-3-phenylurea; pyrimidinylsulphonylurea herbicides such as flazasulphuron 1-(4,6-dimethoxypyrimidin-2-yl)-3-(3-trifluoromethyl-2-pyridylsulphonyl)urea; pyrazosulphuron 5-[(4,6-dimethoxypyrimidin-2-ylcarbamoyl)sulphamoyl]-1-methylpyrazole-4-carboxylic acid; triazinylsulphonylurea herbicides such as thifensulphuron 3-(4-methoxy-6-methyl-1,3,5-triazin-2-ylcarbamoylsulphamoyl)thiophene-2-carboxylic acid; thiadiazolylurea herbicides such as tebuthiuron 1-(5-tert-butyl-1,3,4-thiadiazol-2-yl)-1,3-dimethylurea; and/or unclassified herbicides such as chlorfenac (2,3,6-trichlorophenyl)acetic acid; methazole 2-(3,4-dichlorophenyl)-4-methyl-1,2,4-oxadiazolidine-3,5-dione; tritac (RS)-1-(2,3,6-trichlorobenzyloxy)propan-2-ol; 2,4-D, chlorimuron, and fenoxaprop; and the like, as well as combinations thereof.

In some embodiments, the biocide comprises, alternatively is, a pesticide. General examples of the pesticide include insect repellents such as N,N-diethyl-meta-toluamide, and pyrethroids such as pyrethrin. Specific examples of the pesticide include atrazine, diazinon, and chlorpyrifos. In these or other embodiments, the biocide comprises, alternatively is, an antimicrobial agent. The type and nature of the antimicrobial agent may vary, and can be readily determined by one of skill in the art. Specific antimicrobial agents are commercially available, and include DOWSIL® 5700 and DOWSIL® 5772, which are from Dow Silicones Corporation of Midland, Mich., U.S.A. In certain embodiments, the biocide comprises, alternatively is, a boron-containing material, such as a boric anhydride, borax, or a disodium octaborate tetrahydrate. In various embodiments, the sealant comprises two or more biocides, which are each independently selected from the fungicide, herbicide pesticide, antimicrobial, and other biocidal components exemplified herein.

The amount of the biocide present in the sealant depends on various factors (e.g. the type of biocide(s) utilized, the amount and/or type of the at least one silicone-polyether copolymer, an intended use of the sealant, curing conditions to which the sealant is intended to be exposed, etc.), and may be readily determined by one of skill in the art. In general, where present, the sealant comprises the biocide, or a combination of biocides, in an amount of from 0.01 to 10, alternatively from 0.1 to 5 wt. % based on the total weight of the sealant.

In particular embodiments, the sealant comprises a flame retardant. Examples of suitable flame retardants include organic/carbonaceous flame retardants (e.g. carbon black, etc.), inorganic/mineral-based flame retardants (e.g. hydrated aluminum hydroxide, silicates such as wollastonite, metal complexes of platinum and/or platinum, etc.) and the like, as well as combinations thereof. Additional examples of suitable flame retardants include halogen-based flame retardants, such as decabromodiphenyloxide, octabromordiphenyl oxide, hexabromocyclododecane, decabromobiphenyl oxide, diphenyoxybenzene, ethylene bis-tetrabromophthalmide, pentabromoethyl benzene, pentabromobenzyl acrylate, tribromophenyl maleic imide, tetrabromobisphenyl A, bis-(tribromophenoxy)ethane, bis-(pentabromophenoxy)ethane, polydibomophenylene oxide, tribromophenylallyl ether, bis-dibromopropyl ether, tetrabromophthalic anhydride, dibromoneopentyl gycol, dibromoethyl dibromocyclohexane, pentabromodiphenyl oxide, tribromostyrene, pentabromochlorocyclohexane, tetrabromoxylene, hexabromocyclododecane, brominated polystyrene, tetradecabromodiphenoxybenzene, trifluoropropene, and PVC; phosphorus based flame-retardants, such as (2,3-dibromopropyl)-phosphate, phosphorus, cyclic phosphates, triaryl phosphates, bis-melaminium pentate, pentaerythritol bicyclic phosphate, dimethylmethylphosphate, phosphine oxide diol, triphenyl phosphate, tris-(2-chloroethyl)phosphate, phosphate esters such as tricreyl-, trixylenyl-, isodecyl diphenyl-, ethylhexyl diphenyl-, trioctyl-, tributyl-, and tris-butoxyethyl phosphate esters, and phosphate salts of various amines (e.g. ammonium phosphate); tetraalkyl lead compounds, such as tetraethyl lead; iron pentacarbonyl; manganese methyl cyclopentadienyl tricarbonyl; melamine and derivatives thereof, such as melamine salts; guanidine; dicyandiamide; ammonium sulphamate; alumina trihydrate; magnesium hydroxide alumina trihydrate; and the like, as well as derivatives, modifications, and combinations thereof. The amount of the flame retardant present in the sealant depends on various factors (e.g. the amount and/or type of the at least one silicone-polyether copolymer, an intended use of the sealant, curing conditions to which the sealant is intended to be exposed, a presence/absence of a vehicle/solvent, etc.), and may be readily determined by one of skill in the art. In general, where present, the sealant comprises the flame retardant in an amount of from 0.01 to 15, alternatively from 0.1 to 10 wt. % based on the total weight of the sealant.

In certain embodiments, the sealant comprises a binder. Typically, the binder is a non-reactive, elastomeric, organic polymer, i.e., an elastomeric organic polymer that does not react with the at least one silicone-polyether copolymer. Additionally, the binder is typically compatible with the at least one silicone-polyether copolymer, i.e., the binder does not form a two-phase system when formulated into the sealant with the at least one silicone-polyether copolymer. In general, suitable binders have low gas and moisture permeability, and typically comprise a number average molecular weight (Mn) of from 30,000 to 75,000. However, the binder may comprise a blend of various non-reactive, elastomeric, organic polymers (e.g. of such polymers having a high molecular weight with those having a low molecular weight). In such instances, the higher molecular weight polymer(s) typically comprise a Mn of from 100,000 to 600,000, and the lower molecular weight polymer(s) typically comprise a Mn of from 900 to 10,000, alternatively 900 to 3,000. The value for the lower end of the Mn ranges is typically selected such that the binder is compatible with the at least one silicone-polyether copolymer and the other ingredients of the sealant, as understood by those of skill in the art. The binder may comprise or be one non-reactive, elastomeric, organic polymer or, alternatively may comprise two or more non-reactive, elastomeric, organic polymers that differ from one another, e.g. on a basis of structure, viscosity, average molecular weight (Mn or Mw), polymer units, sequence, etc., or combinations thereof.

Examples of suitable binders include polyisobutylenes, which are known in the art and are commercially available. Specific examples of polyisobutylenes include those marketed under the trademark OPPANOL® by BASF Corporation of Germany, as well as the various grades of hydrogenated polyisobutene marketed under the trademark PARLEAM® by NOF Corp. of Japan. Additional examples of suitable polyisobutylenes are commercially available from ExxonMobil Chemical Co. of Baytown, Tex., U.S.A. under the trademark VISTANEX®. These include VISTANEX® MML-80, MML-100, MML-120, and MML-140, which are paraffinic hydrocarbon polymers, composed of long, straight-chain macromolecules containing only chain-end olefinic bonds. VISTANEX® MM polyisobutylenes have a viscosity average molecular weight of from 70,000 to 90,000, and VISTANEX® LM polyisobutylenes (e.g. LM-MS) are lower-molecular weight polyisobutylenes having a viscosity average molecular weight of from 8,700 to 10. Additional examples of polyisobutylenes include VISTANEX LM-MH (viscosity average molecular weight of 10,000 to 11,700); Soltex PB-24 (Mn 950), Indopol® H-100 (Mn 910), Indopol® H-1200 (Mn 2100), from Amoco Corp. of Chicago, Illinois, U.S.A.; NAPVIS® and HYVIS® (e.g. NAPVIS® 200, D10, and DE3; and HYVIS® 200) from BP Chemicals of London, England. The NAPVIS® polyisobutylenes typically have a Mn of from 900 to 1300. In addition, or as an alternative, to the polyisobutylene(s), the binder may comprise or be a butyl rubber, a styrene-ethylene/butylene-styrene (SEBS) block copolymer, a styrene-ethylene/propylene-styrene (SEPS) block copolymer, polyolefin plastomer, or combinations thereof. SEBS and SEPS block copolymers are known in the art and are commercially available as Kraton® G polymers from Kraton Polymers U.S. LLC of Houston, Tex., U.S.A., and as Septon polymers from Kuraray America, Inc., New York, N.Y., U.S.A. Polyolefin plastomers are also known in the art and are commercially available as AFFINITY® GA 1900 and AFFINITY® GA 1950 compositions from Dow Chemical Company, Elastomers & Specialty Products Division, Midland, Mich., U.S.A.

The amount of the binder present in the sealant depends on various factors (e.g. the amount and/or type of the at least one silicone-polyether copolymer, an intended use of the sealant, curing conditions to which the sealant is intended to be exposed, a presence/absence of a vehicle/solvent, etc.), and may be readily determined by one of skill in the art. In general, where present, the sealant comprises the binder in an amount of from 1 to 50, alternatively from 5 to 40, alternatively from 5 to 35 parts by weight, based on the combined weights of all components in the sealant.

In some embodiments, the sealant comprises an anti-aging additive. Examples of anti-aging additives include antioxidants, UV absorbers, UV and/or light stabilizers, heat stabilizers, and combinations thereof. The anti-aging additive may be or comprise but one anti-aging additive or, alternatively, may comprise two or more different anti-aging additives. Moreover, one particular anti-aging additive may serve multiple functions (e.g. as both a UV absorber and a UV stabilizer, as both an antioxidant and a UV absorber, etc.). Many suitable anti-aging additives are known in the art and are commercially available. For example, suitable antioxidants include phenolic antioxidants (e.g. fully-sterically hindered phenols and partially-hindered phenols) and combinations of phenolic antioxidants with stabilizers (e.g. sterically hindered amines, such as tetramethyl-piperidine derivatives, also known as "hindered amine light stabilizers" (HALS)). Suitable phenolic antioxidants include vitamin E and IRGANOX® 1010 from BASF. IRGANOX® 1010 comprises pentaerythritol tetrakis(3-(3,5-di-t-butyl-4-hydroxyphenyl)propionate). Examples of UV absorbers include phenol, 2-(2H-benzotriazol-2-yl)-6-dodecyl-4-methyl-, branched and linear (TINUVIN® 571). Examples of UV stabilizers include bis(1,2,2,6,6-pentamethyl-4-piperidyl) sebacate; methyl 1,2,2,6,6-pentamethyl-4-piperidyl/sebacate; and combinations thereof (TINUVIN®272).

These and other TINUVIN® additives, such as TINUVIN® 765 are commercially available from BASF. Other UV and light stabilizers are commercially available, and are exemplified by LowLite from Chemtura, OnCap from PolyOne, and Light Stabilizer 210 from E. I. du Pont de Nemours and Company of Delaware, U.S.A. Oligomeric (higher molecular weight) stabilizers may also be utilized in or as the anti-aging additive, for example, to minimize potential for migration of the anti-aging additive out of the sealant or a cured product thereof. Example of such oligomeric antioxidant stabilizers include TINUVIN® 622, which is a dimethylester of butanedioic acid copolymerized with 4-hydroxy-2,2,6,6-tetramethyl-1-piperidine ethanol. Examples of heat stabilizers include iron oxides, carbon blacks, iron carboxylate salts, cerium hydrates, barium zirconates, cerium and zirconium octoates, porphyrins, and the like, as well as combinations thereof.

The amount of the anti-aging additive present in the sealant depends on various factors (e.g. the amount and/or type of the at least one silicone-polyether copolymer, an intended use of the sealant, curing conditions to which the sealant is intended to be exposed, etc.), and may be readily determined by one of skill in the art. In general, where present, the sealant comprises the anti-aging additive in an amount of from greater than 0 to 5, alternatively from 0.1 to 4, alternatively from 0.5 to 3 wt. %, based on the total weight of the sealant.

In certain embodiments, the sealant comprises a water release agent, i.e., a component that releases water over time (e.g. in response to an applied condition, such as a temperature and/or a pressure). Typically, the water release agent contains an amount of water sufficient to partially, alternatively fully, react the sealant, and is thus selected to release the amount of water when exposed to the applied condition (e.g. a use temperature of the sealant) for a sufficient amount of time. Generally, however the water release agent is selected to sufficiently bind the water to thereby prevent too much water from being released during making and/or storing the sealant. For example, the water release agent typically binds the water sufficiently during compounding/formulating the sealant, such that sufficient water is available for condensation reaction of the at least one silicone-polyether copolymer during or after the application process in which the sealant is used. This "controlled release" property also may provide the benefit of preventing too much water from being released and/or water being released too rapidly during the application process, since this may cause bubbling or voiding in the reaction product formed by condensation reaction of the at least one silicone-polyether copolymer of the sealant. The particular water release agent selected can depend on various factors, (e.g. the other components of the sealant, the amount/type of the at least one silicone-polyether copolymer, the type of the condensation reaction catalyst, the process conditions under which the sealant will be formulated, etc.) and will be readily determined by one of skill in the art. Examples of suitable water release agents are exemplified by metal salt hydrates, hydrated molecular sieves, and precipitated carbonates. Particular examples include the precipitated calcium carbonate available from Solvay under the trademark WINNOFIL® SPM. In certain embodiments, the water release agent is selected to include, alternatively to be, precipitated calcium carbonate. The water release agent may be selected to ensure that not all of the water content is released during compounding, while still releasing a sufficient amount of water for condensation reaction of the at least one silicone-polyether copolymer when exposed to the application temperature range for a sufficient period of time. The amount of the water release agent present in the sealant depends on various factors (e.g. the water permeability of the at least one silicone-polyether copolymer, a presence/absence of vehicle/solvent, a presence/absence of drying agent, the method by which the sealant is to be formulated/prepared, etc.), and may be readily determined by one of skill in the art. In general, where present, the sealant comprises the water release agent in an amount of from 1 to 50, alternatively from 5 to 40, alternatively from 5 to 30 parts by weight, based on the combined weights of all components in the sealant.

In some embodiments, the sealant comprises a pigment (i.e., a component that imparts color to the sealant and/or a reaction product thereof). Such pigments may comprise any inorganic compounds, for example those of metals such as chromium oxides, titanium oxides, cobalt pigments, as well as those that are not based on such metals, e.g. non-metal inorganic compounds. Examples of suitable pigments include indigos, titanium dioxides, carbon blacks, and combinations thereof, as well as other commercially available pigments such as Stan-Tone 505P01 Green, which is available from PolyOne. In certain embodiments, the pigment comprises a carbon black. Specific examples of carbon blacks include Shawinigan Acetylene black, which is commercially available from Chevron Phillips Chemical Company LP; SUPERJET® Carbon Black (e.g. LB-1011) supplied by Elementis Pigments Inc., of Fairview Heights, Ill. U.S.A.; SR 511 supplied by Sid Richardson Carbon Co, of Akron, Ohio U.S.A.; and N330, N550, N762, N990 (from Degussa Engineered Carbons of Parsippany, N.J., U.S.A.). The amount of the pigment present in the sealant depends on various factors (e.g. the amount and/or type of the at least one silicone-polyether copolymer, an intended use of the sealant, a presence/absence of a vehicle/solvent, etc.), and may be readily determined by one of skill in the art. In general, where present, the sealant comprises the pigment in an amount of from greater than 0 to 20, alternatively from 0.001 to 10, alternatively from 0.001 to 5 wt. % based on the total weight of the sealant.

In certain embodiments, the sealant comprises a rheology additive, such as a rheology modifier and/or a viscosity modifier. Examples of suitable rheological additives include waxes; polyamides; polyamide waxes; hydrogenated castor oil derivatives; metal soaps, such as calcium, aluminum, and/or barium stearates; and the like, as well as derivatives, modifications, and combinations thereof. In particular embodiments, the rheology modifier is selected to facilitate incorporation of fillers, compounding, de-airing, and/or mixing of the sealant (e.g. during preparation thereof), as well understood by those of skill in the art. Specific examples of rheological additives include those known in the art which are commercially available. Examples of such rheological additives include Polyvest, which is commercially available from Evonik; Disparlon which is commercially available from King Industries; Kevlar Fibre Pulp, which is commercially available from Du Pont; Rheospan which is commercially available from Nanocor; Ircogel, which is commercially available from Lubrizol; Crayvallac® SLX, which is commercially available from Palmer Holland, and the like, as well as combinations thereof.

In some embodiments, the rheology modifier comprises, alternatively is, a wax (e.g. a paraffin wax, a microcrystalline wax, or a combination thereof). The wax typically comprises non-polar hydrocarbon(s), which may comprise branched structures, cyclic structures, or combinations thereof. Examples of suitable waxes include petroleum microcrystalline waxes available from Strahl & Pitsch, Inc., of West Babylon, N.Y., U.S.A. under the names SP 96 (melting point of from 62 to 69° C.), SP 18 (melting point of from 73 to 80° C.), SP 19 (melting point of from 76 to 83° C.), SP 26 (melting point ranging from 76 to 83° C.), SP 60 (melting point of from 79 to 85° C.), SP 617 (melting point of from 88 to 93° C.), SP 89 (melting point of from 90 to 95° C.), and SP 624 (melting point of from 90 to 95° C.). Further examples of suitable waxes include those marketed under the trademark Multiwax® by Crompton Corporation of Petrolia, Pa., U.S.A. Such waxes include which include Multiwax® 180-W, which comprises saturated branched and cyclic non-polar hydrocarbons and has melting point of from 79 to 87° C.; Multiwax® W-445, which comprises saturated branched and cyclic non-polar hydrocarbons, and has melting point of from 76 to 83° C.; and Multiwax® W-835, which comprises saturated branched and cyclic non-polar hydrocarbons, and has melting point of from 73 to 80° C. In certain embodiments, the wax comprises, alternatively is, a microcrystalline wax that is a solid at room temperature (25° C.). In some embodiments, the wax is selected to have a melting point within a desired application temperature range (i.e., the temperature range within which the sealant is intended to be used/applied). It is thought that the wax, when molten, serves as a process aid, substantially easing the incorporation of filler in the composition during compounding, the compounding process itself, as well as in during a de-airing step, if used. For example, in certain embodiments, the wax has a melt temperature below 100° C. and may facilitate mixing of parts (e.g. when the sealant is a multiple part composition) before application, even in a simple static mixer. In such instances, the wax may also facilitate application of the sealant at temperatures of from 80 to 110° C., alternatively 90 to 100° C., with good rheology.

The amount of the rheological additive present in the sealant depends on various factors (e.g. the amount and/or type of the at least one silicone-polyether copolymer, an intended use of the sealant, curing conditions to which the sealant is intended to be exposed, a presence/absence of a vehicle/solvent, etc.), and may be readily determined by one of skill in the art. In general, where present, the sealant comprises the rheological additive in an amount of from greater than 0 to 20, alternatively from 1 to 15, alternatively from 1 to 5, parts by weight, based on the combined weights of all components in the sealant.

In certain embodiments, the sealant comprises a vehicle (e.g. a carrier vehicle, such as a solvent and/or diluent). Depending on a selection of various components of the sealant, the carrier vehicle may be, for example, an oil (e.g. an organic oil and/or a silicone oil), a solvent, water, etc. As will be understood by one of skill in the art, the particular vehicle utilized, if any, is selected to facilitate (e.g. increase) flow of the sealant or a portion thereof (e.g. one or more parts of the sealant when the sealant is a multiple-part composition); as well as the introduction of certain components (e.g. the at least one silicone-polyether copolymer, the chain extender, the end-blocker, etc.). As such, suitable vehicles are varied, and generally include those which help fluidize one or more components of the sealant, but essentially do not react with any of such components. Accordingly, the vehicle may be selected based on a solubility of one or more components of the sealant, volatility, or both. In this sense, the solubility refers to the vehicle being sufficient to dissolve and/or disperse the one or more components of the sealant, and the volatility refers to vapor pressure of the vehicle. If the vehicle is too volatile (i.e., has a vapor pressure too high for the intended use), bubbles may form in the sealant at the application temperature, which may lead to cracks and/or otherwise weaken or detrimentally affect properties of the cured product formed from the sealant. However, if the vehicle is not volatile enough (i.e., has a vapor pressure too low for the intended use) the vehicle may remain in the cured product of the sealant and/or function as a plasticizer therein. Examples of suitable vehicles generally include silicone fluids, organic fluids, and combinations thereof.

In some embodiments, the vehicle of the sealant comprises, alternatively is, a silicone fluid. The silicone fluid is typically a low viscosity and/or volatile siloxane. In some embodiments, the silicone fluid is a low viscosity organopolysiloxane, a volatile methyl siloxane, a volatile ethyl siloxane, a volatile methyl ethyl siloxane, or the like, or combinations thereof. Typically, the silicone fluid has a viscosity at 25° C. in the range of 1 to 1,000 mm$^2$/sec. In some embodiments, the silicone fluid comprises a silicone having the general formula $(R^{28}R^{29}SiO)_l$, where each $R^{28}$ and $R^{29}$ is independently selected from H and substituted or unsubstituted hydrocarbyl groups, and subscript l is from 3 to 8. Specific examples of suitable silicone fluids include hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3, bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, caprylyl methicone, hexamethyldisiloxane, heptamethyloctyltrisiloxane, hexyltrimethicone, and the like, as well as derivatives, modifications, and combinations thereof. Additional examples of suitable silicone fluids include polyorganosiloxanes with suitable vapor pressures, such as from $5 \times 10^{-7}$ to $1.5 \times 10^{-6}$ m$^2$/s, include DOWSIL® 200 Fluids and DOWSIL® OS FLUIDS, which are commercially available from Dow Silicones Corporation of Midland, Mich., U.S.A.

In certain embodiments, the vehicle of the sealant comprises, alternatively is, an organic fluid, which typically comprises an organic oil including a volatile and/or semi-volatile hydrocarbon, ester, and/or ether. General examples of such organic fluids include volatile hydrocarbon oils, such as $C_6$-$C_{16}$ alkanes, $C_8$-$C_{16}$ isoalkanes (e.g. isodecane, isododecane, isohexadecane, etc.) $C_8$-$C_{16}$ branched esters (e.g. isohexyl neopentanoate, isodecyl neopentanoate, etc.), and the like, as well as derivatives, modifications, and combinations thereof. Additional examples of suitable organic fluids include aromatic hydrocarbons, aliphatic hydrocarbons, alcohols having more than 3 carbon atoms, aldehydes, ketones, amines, esters, ethers, glycols, glycol ethers, alkyl halides, aromatic halides, and combinations thereof. Hydrocarbons include isododecane, isohexadecane, Isopar L ($C_{11}$-$C_{13}$), Isopar H ($C_{11}$-$C_{12}$), hydrogenated polydecene. Ethers and esters include isodecyl neopentanoate, neopentylglycol heptanoate, glycol distearate, dicaprylyl carbonate, diethylhexyl carbonate, propylene glycol n-butyl ether, ethyl-3 ethoxypropionate, propylene glycol methyl ether acetate, tridecyl neopentanoate, propylene glycol methylether acetate (PGMEA), propylene glycol methylether (PGME), octyldodecyl neopentanoate, diisobutyl adipate, diisopropyl adipate, propylene glycol dicaprylate/dicaprate, octyl ether, octyl palmitate, and combinations thereof.

In some embodiments, the vehicle comprises, alternatively is, an organic solvent. Examples of the organic solvent include those comprising an alcohol, such as methanol, ethanol, isopropanol, butanol, and n-propanol; a ketone, such as acetone, methylethyl ketone, and methyl isobutyl ketone; an aromatic hydrocarbon, such as benzene, toluene, and xylene; an aliphatic hydrocarbon, such as heptane, hexane, and octane; a glycol ether, such as propylene glycol methyl ether, dipropylene glycol methyl ether, propylene glycol n-butyl ether, propylene glycol n-propyl ether, and ethylene glycol n-butyl ether; a halogenated hydrocarbon, such as dichloromethane, 1,1,1-trichloroethane and methylene chloride; chloroform; dimethyl sulfoxide; dimethyl formamide, acetonitrile; tetrahydrofuran; white spirits; mineral spirits; naphtha; n-methylpyrrolidinone; and the like, as well as derivatives, modifications, and combination thereof.

Other vehicles may also be utilized in the sealant. For example, in some embodiments, the vehicle comprises, alternatively is, an ionic liquid. Examples of ionic liquids include anion-cation combinations. Generally, the anion is selected from alkyl sulfate-based anions, tosylate anions, sulfonate-based anions, bis(trifluoromethanesulfonyl)imide anions, bis(fluorosulfonyl)imide anions, hexafluorophosphate anions, tetrafluoroborate anions, and the like, and the cation is selected from imidazolium-based cations, pyrrolidinium-based cations, pyridinium-based cations, lithium cation, and the like. However, combinations of multiple cations and anions may also be utilized. Specific examples of the ionic liquids typically include 1-butyl-1-methylpyrrolidinium bis(trifluoromethanesulfonyl)imide, 1-methyl-1-propylpyrrolidinium bis-(trifluoromethanesulfonyl)imide, 3-methyl-1-propylpyridinium bis(trifluoromethanesulfonyl)imide, N-butyl-3-methylpyridinium bis(trifluoromethanesulfonyl)imide, 1-methyl-1-propylpyridinium bis(trifluoromethanesulfonyl)imide, diallyldimethylammonium bis(trifluoromethanesulfonyl)imide, methyltrioctylammonium bis(trifluoromethanesulfonyl)imide, 1-butyl-3-methylimidazolium bis(trifluoromethanesulfonyl)imide, 1,2-dimethyl-3-propylimidazolium bis(trifluoromethanesulfonyl)imide, 1-ethyl-3-methylimidazolium bis(trifluoromethanesulfonyl)imide, 1-vinylimidazolium·bis(trifluoromethanesulfonyl)imide, 1-allyl imidazolium bis(trifluoromethanesulfonyl)imide, 1-allyl-3-methylimidazolium bis(trifluoromethanesulfonyl)imide, lithium bis(trifluoromethanesulfonyl)imide, and the like, as well as derivatives, modifications, and combinations thereof.

The amount of the vehicle present in the sealant depends on various factors (e.g. the amount and/or type of the at least one silicone-polyether copolymer, the manner by which the sealant was formulated, curing conditions to which the sealant is intended to be exposed, etc.), and may be readily determined by one of skill in the art. In general, where present, the sealant comprises the vehicle in an amount of from 1 to 99, alternatively from 1 to 75, alternatively from 2 to 60, alternatively from 2 to 50 wt. %, based on the total weight of the sealant.

In particular embodiments, the sealant comprises a tackifying agent. General examples of suitable tackifying agents typically include those comprising an aliphatic hydrocarbon resin (e.g. a hydrogenated polyolefin having 6 to 20 carbon atoms), a hydrogenated terpene resin, a rosin ester, a hydrogenated rosin glycerol ester, or a combination thereof. Specific examples of suitable tackifying agents include natural or modified rosins such as gum rosin, wood rosin, tall-oil rosin, distilled rosin, hydrogenated rosin, dimerized rosin, and polymerized rosin; glycerol and pentaerythritol esters of natural or modified rosins, such as glycerol esters of pale wood rosins, glycerol esters of hydrogenated rosins, glycerol esters of polymerized rosins, pentaerythritol esters of hydrogenated rosins, and phenolic-modified pentaerythritol esters of rosin; copolymers and/or terpolymers of natural terpenes, such as styrene/terpene and/or alpha methyl styrene/terpene polymers; polyterpene resins having a softening point, as determined by ASTM method E28, of from 60 to 150° C., such as those produced via the polymerization of terpene hydrocarbons (e.g. pinene) in the presence of Friedel-Crafts catalysts, as well as the hydrogenation products thereof (e.g. hydrogenated polyterpenes); phenolic modified terpene resins and hydrogenated derivatives thereof, such as those produced via acid-mediated condensation of a bicyclic terpene and a phenol; aliphatic petroleum hydrocarbon resins, such as those produced via the polymerization of monomers consisting of primarily of olefins and diolefins, those having a ring and ball softening point of from 60 to 135° C., and also hydrogenated aliphatic petroleum hydrocarbon resins; alicyclic petroleum hydrocarbon resins and hydrogenated derivatives thereof; aliphatic/aromatic or cycloaliphatic/aromatic copolymers and hydrogenated derivatives thereof; and combinations thereof. In some embodiments, the sealant comprises a solid tackifying agent (i.e., a tackifying agent having a ring and ball softening point above 25° C.). Other examples of suitable tackifying agents include commercially available varieties, such as the aliphatic hydrocarbon resins exemplified by ESCOREZ 1102, 1304, 1310, 1315, and 5600 from Exxon Chemical, and Eastotac H-100, H-115E, and H-130L from Eastman; the hydrogenated terpene resins exemplified by Arkon P 100 from Arakawa Chemicals, and Wingtack 95 from Goodyear; the hydrogenated rosin glycerol esters exemplified by Staybelite Ester 10 and Foral from Hercules; the polyterpenes exemplified by Piccolyte A125 from Hercules; the aliphatic/aromatic and/or cycloaliphatic/aromatic resins exemplified by ECR 149B and ECR 179A from Exxon Chemical; and combinations thereof. The amount of the tackifying agent present in the sealant depends on various factors (e.g. the amount and/or type of the at least one silicone-polyether copolymer, the type and/or amount of other components of the sealant, an intended use of the sealant, etc.), and may be readily determined by one of skill in the art. In general, where present, the sealant comprises the tackifying agent in an amount of from 1 to 20 parts by weight, based on the combined weights of all components in the sealant.

In certain embodiments, the sealant comprises a corrosion inhibitor. Examples of suitable corrosion inhibitors include benzotriazoles, mercaptabenzotriazoles, and the like, as well as combinations thereof. Specific examples of suitable corrosion inhibitors are known in the art and commercially available, such as CUVAN® 826 (e.g. a 2,5-dimercapto-1,3,4-thiadiazole derivative) and CUVAN® 484 (an alkylthiadiazole), which are available from R. T. Vanderbilt of Norwalk, Conn., U.S.A.

The amount of the corrosion inhibitor present in the sealant depends on various factors (e.g. the amount and/or type of the at least one silicone-polyether copolymer, an intended use of the sealant, curing conditions to which the sealant is intended to be exposed, etc.), and may be readily determined by one of skill in the art. In general, where present, the sealant comprises the corrosion inhibitor in an amount of from 0.05 to 0.5 wt. % based on total weight of the sealant.

As introduced in various sections above, various components of the sealant may be utilized for multiple purposes, and thus certain additives may overlap with regard to the components described herein. For example, certain alkoxysilanes may be useful as filler treating agents, as adhesion promoters, and as crosslinkers. Additionally, the sealant may further comprise additional additives not described above, such as catalyst inhibitors, curing promotors, color-change additives, etc. Such additional additives are independently selected, and each utilized in the sealant in an amount selected based on the indented use thereof, as readily determined by one of skill in the art. Typically, where present, the sealant comprises each of such additional additives in an amount of from 0.001 to 10, alternatively from 0.01 to 5, alternatively from 0.1 to 1 wt. % based on total weight of the sealant.

As described above, the sealant may be prepared as a one-part composition, or as a multiple-part composition (e.g. comprising 2, 3, 4, or more parts). For example, in some embodiments, the sealant is prepared as the one-part composition, which may be prepared by combining all components together by any convenient means, such as mixing. Such a one-part composition may be made by optionally combining (e.g. premixing) the at least one silicone-polyether copolymer with various additives (e.g. the filler) to form an intermediate mixture, and subsequently combining (e.g. via mixing) the intermediate mixture with a pre-mix comprising the condensation reaction catalyst and other various additives to form a sealant mixture or the sealant. Other additives (e.g. the anti-aging additive, the pigment, etc.) may be added to the sealant at any desired stage, such as via combination with the intermediate mixture, the pre-mix, or the sealant mixture. As such, a final mixing step may be performed (e.g. under substantially anhydrous conditions) to form the sealant, which is typically stored under substantially anhydrous conditions, for example in sealed containers, until ready for use.

In some embodiments, the sealant is prepared as the multiple-part composition (e.g. when the crosslinker is utilized). In such embodiments, the condensation reaction catalyst and the crosslinker are typically stored in separate parts, which are combined shortly before use of the sealant. For example, the sealant may comprise a two part curable composition prepared by combining the at least one silicone-polyether copolymer and the crosslinker to form a first (i.e., curing agent) part by any convenient means (e.g. mixing). A second (i.e., base) part may be prepared by combining the condensation reaction catalyst and (1) copolymer by any convenient means (e.g. mixing). The components may be combined at ambient or elevated temperature and under ambient or anhydrous conditions, depending on various factors, e.g. whether a one part or multiple part composition is selected. The base part and curing agent part may then be combined by any convenient means, such as mixing, shortly before use. The base part and curing agent part may be combined in a 1:1 ratio, or in a relative amount of base: curing agent ranging from 1:1 to 10:1.

The equipment used for mixing the components of the sealant is not specifically restricted, and is typically selected depending on the type and amount of each component selected for use in the sealant or a part thereof (collectively, the "sealant compositions".) For example, agitated batch kettles may be used for relatively low viscosity sealant compositions, such as compositions that would react to form gums or gels. Alternatively, continuous compounding equipment (e.g. extruders, such as twin screw extruders) may be used for more viscous sealant compositions, as well as sealant compositions containing relatively high amounts of particulates. Exemplary methods that can be used to prepare the sealant compositions described herein include those disclosed in, for example, U.S. Patent Publication Nos. 2009/0291238 and 2008/0300358, which portions are herein incorporated by reference.

The sealant compositions made as described above may be stable when stored in containers that reduce or prevent exposure of the sealant compositions to moisture. However, the sealant compositions, may react via condensation reaction when exposed to atmospheric moisture. Additionally, when the water release agent is utilized, the sealant compositions may react via condensation reaction without exposure to atmospheric moisture.

A cured product is also provided. The cured product is formed from the sealant. More specifically, the cured product is formed by curing the sealant, e.g. via the condensation reaction described above.

A composite article comprising the cured product is also provided. More specifically, the composite article comprises a substrate and the cured product disposed on the substrate. The composite article is formed by disposing the sealant on the substrate, and curing the sealant to give the cured product on the substrate, thereby preparing the composite article. The substrate is exemplified by, for example, an exterior building façade.

A method of sealing a space defined between two elements is also disclosed. This method comprises applying the sealant to the space, and curing the sealant in the space, thereby sealing the space.

As described above, the subject invention allows for selectively controlling or otherwise tuning properties of the cured product of the composition as well as its cure speed. Generally speaking, it's difficult or has been traditionally impossible to optimize modulus and tensile strength without sacrificing or influencing cure speed and a concentration of condensation reaction catalyst. Said differently, maximizing cure speed can require high concentrations of condensation reaction catalyst and can influence properties of the cured product, such as modulus and elongation.

It has surprisingly been found that through use of different endcapping organosilicon compounds, resulting in different silicone moieties X having formulas (I) and (II) within the at least one silicone-polyether copolymer of the composition, that moduli and elongation can be improved as compared to using only, for example, silicone moieties X of formula (I). Moreover, by including different silicone moieties X in the at least one silicone-polyether copolymer of the composition, a much faster cure time can be achieved as compared to using only, for example, silicone moieties X of formula (II). In fact, these surprising benefits can be achieved at a concentration of the condensation reaction catalyst that is lower than conventional concentrations required, which is particularly advantageous, especially when the condensation reaction catalyst comprises tin. Cure speed can be maximized by increasing a content of silicone moieties X of formula (I), and mechanical properties of the cured product, such as modulus and elongation, can be optimized by increasing a content of silicone moieties X of formula (II). As such, depending on desired cure speed, concentration of condensation reaction catalyst, and performance properties of the cured product, the relative amounts of silicone moieties X of formula (I) and silicone moieties X of formula (II) allow for selectively controlling or tuning reaction parameters and performance properties. Thus, the subject invention also provides a method of selectively controlling or tuning reaction parameters and performance properties of the composition and related cured product.

The following examples are intended to illustrate the invention and are not to be viewed in any way as limiting to the scope of the invention.

Certain components utilized in the Examples are set forth in Table 1 below.

TABLE 1

Components/Compounds Utilized

| Abbreviation | Meaning/Definition |
|---|---|
| Polyether Compound 1 (PC1) | $CH_2\!\!=\!\!C(CH_3)CH_2O\!-\![CH(CH_3)CH_2O]_{68}\!-\!CH(CH_3)CH_2O\!-\![CH_2CH(CH_3)O]_{68}\!-\!CH_2C(CH_3)\!\!=\!\!CH_2$. |
| Polyether Compound 2 (PC2) | $\{H_2C\!\!=\!\!CHCH_2\!-\![OCH_2CH(CH_3)]_{127}\!-\!OCH_2\}_2\!-\!CH\!-\!O\!-\![CH(CH_3)CH_2O]_{127}\!-\!CH_2CH\!\!=\!\!CH_2$ |
| Chain Extending Organosilicon Compound (CEOC) | $HSiMe_2[OSiMe_2]_{4.5}OSiMe_2H$ |
| First Endcapping Organosilicon Compound (FEOC) | $HSiMe_2OSiMe_2\!-\!CH_2CH_2\!-\!Si(OMe)_3$ |
| Second Endcapping Organosilicon Compound (SEOC) | $HSi(OMe)_2Me$ |
| Third Endcapping Organosilicon Compound (TEOC) | $HSi(OEt)_3$ |
| Converter | Methanol, anhydrous (MeOH) |
| Adhesion Promotor | 3-(2-Aminoethylamino)propyltrimethoxysilane |
| Catalyst | Dibutyltin dilaureate |
| Hydrosilylation Catalyst (HC) | Platinum(0)-1,3-divinyl-1,1,3,3-tetra,ethyldisiloxane in toluene at 1 wt. % |
| Me | Methyl |
| Et | Ethyl |

General Procedure 1: Preparation Examples 1-5

Preparation Examples 1-5 follow General Procedure 1. The particular amounts of each component utilized in Preparation Examples 1-5 are detailed below in Table 2.

In General Procedure 1, a rotary flask was fitted with a rotary evaporator equipped with an oil heating bath. The flask was purged with $N_2$, and the Polyether Compound 1 was disposed therein. The rotary evaporator was set to 90 revolutions per minute (rpm), and evacuated three times with $N_2$ purging to remove oxygen. The heating bath was set to 115° C. and the rotary evaporator was evacuated to maximum vacuum to dry the Polyether Compound 1 for 2 to 3 hours. The flask was removed from the oil heating bath, cooled to ambient temperature under vacuum, purged with $N_2$ and transferred into a nitrogen glove bag.

Then, the Polyether Compound 1 was weighed into a SpeedMixer cup. The Chain Extending Organosilicon Compound, First Endcapping Organosilicon Compound, and Hydrosilylation Catalyst were disposed in the cup and stirred with a spatula for 30 seconds. The Second Endcapping Organosilicon Compound was weighed into a syringe and disposed into the contents of the cup. The cup was then closed and sealed with electrical tape and mixed on a speedmixer at 3500 rpm for 3 min. The cup was then placed into a metal tin container along with a desiccant and purged with nitrogen. The metal tin container was then placed in an oven at 55° C. for 6 hours. The metal tin container was then removed from the oven, cooled to room temperature, and the cup was removed and placed into glove bag for analytic sampling of its contents (NMR, viscosity, GPC, etc.).

Table 2 below shows the amounts of each component utilized in Preparation Examples 1-5 in accordance with General Procedure 1.

TABLE 2

Preparation Examples 1-5

| Preparation Example | PC1 (g) | HC [ppm Pt] | CEOC (g) | FEOC (g) | SEOC (g) |
|---|---|---|---|---|---|
| 1 | 87.8 | 6 | 3.0 | 1.7 | 0.2 |
| 2 | 86.1 | 6 | 3.0 | 1.1 | 0.4 |
| 3 | 87.7 | 6 | 3.0 | 0.6 | 0.6 |
| 4 | 39.2 | 5 | 1.4 | 0.304 | 0.183 |
| 5 | 38.1 | 5 | 1.3 | 0.351 | 0.098 |

General Procedure 2: Preparation Examples 6-11

Preparation Examples 6-11 follow General Procedure 2. The particular amounts of each component utilized in Preparation Examples 6-11 are detailed below in Table 3.

In General Procedure 2, a rotary flask was fitted with a rotary evaporator equipped with an oil heating bath. The flask was purged with $N_2$, and the Polyether Compound 1 was disposed therein. The rotary evaporator was set to 90 revolutions per minute (rpm), and evacuated three times with $N_2$ purging to remove oxygen. The heating bath was set to 115° C. and the rotary evaporator was evacuated to maximum vacuum to dry the Polyether Compound 1 for 2 to 3 hours. The flask was removed from the oil heating bath, cooled to ambient temperature under vacuum, purged with $N_2$ and transferred into a nitrogen glove bag.

Then, the Polyether Compound 1 was weighed into a SpeedMixer cup. The Chain Extending Organosilicon Compound, First and Third Endcapping Organosilicon Compounds (when the Third Endcapping Organosilicon Compound is utilized in Preparation Examples 6-8, as set forth in Table 3 below), and Hydrosilylation Catalyst were disposed in the cup and stirred with a spatula for 30 seconds. In Preparation Examples 9-11, the Second Endcapping Organosilicon Compound was weighed into a syringe and disposed into the contents of the cup. The cup was then closed and sealed with electrical tape and mixed on a speedmixer at 3500 rpm for 3 min. The cup was then placed into a metal tin container along with a desiccant and purged with nitrogen. The metal tin container was then placed in an oven at 55° C. for 6 hours. The metal tin container was then removed from the oven, cooled to room temperature, and the cup was removed and placed into glove bag for analytic sampling (via NMR). The cup was transferred back into the glove bag and Converter and a catalytic amount of hydrochloric acid are disposed in the cup and stirred for 30 seconds with a spatula. The cup was closed and sealed with electrical tap, and mixed on a speedmixer for 3 min at 3500 rpm. The cup was left overnight in the glove bag, and the contents of the cup were transferred into a rotary flask. Residual amounts of the Converter, ethanol, and hydrochloric acid were removed via the rotary evaporator first at 80° C. and then at 115° C. for one hour. The contents of the rotary flask were transferred back into the glove bag for analytic sampling (NMR, viscosity, GPC, etc.).

Table 3 below shows the amounts of each component utilized in Preparation Examples 6-11 in accordance with General Procedure 2. In Table 3, the content of hydrochloric acid utilized is based on parts per million relative to the amount of Converter utilized.

TABLE 3

Preparation Examples 6-11

| Preparation Example | PC1 (g) | HC [ppm Pt] | CEOC (g) | FEOC (g) | SEOC (g) | TEOC (g) | Converter (g) | HCl [ppm] |
|---|---|---|---|---|---|---|---|---|
| 6 | 79.5 | 6 | 2.6 | 1.45 | — | 0.25 | 16.8 | 12 |
| 7 | 75.9 | 6 | 2.6 | 1.0 | — | 0.5 | 20.0 | 12 |
| 8 | 77.0 | 6 | 2.7 | 0.76 | — | 0.58 | 16.2 | 12 |
| 9 | 75.9 | 6 | 2.6 | — | 0.18 | 0.83 | 15.9 | 12 |
| 10 | 75.7 | 6 | 2.6 | — | 0.36 | 0.57 | 15.8 | 12 |
| 11 | 74.7 | 6 | 2.6 | — | 0.53 | 0.32 | 15.6 | 12 |

Preparation Example 12

Preparation Example 12 follows General Procedure 1 with the only difference being that no Second Endcapping Organosilicon Compound was used. Instead, Preparation Example 12 used only the First Endcapping Organosilicon Compound. Table 4 below shows the amounts of each component utilized in Preparation Example 12.

TABLE 4

Preparation Example 12

| Preparation Example | PC1 (g) | HC [ppm Pt] | CEOC (g) | FEOC (g) |
|---|---|---|---|---|
| 12 | 443.1 | 5 | 15.1 | 10.0 |

Preparation Example 13

Preparation Example 13 follows General Procedure 1 with the only difference being that no First Endcapping Organosilicon Compound was used. Instead, Preparation Example 13 used only the Second Endcapping Organosilicon Compound. As in General Procedure 1, the Second Endcapping Organosilicon Compound was disposed in the cup via a syringe, rather than being disposed in the cup with the Chain Extending Organosilicon Compound and Polyether Compound 1. Table 5 below shows the amounts of each component utilized in Preparation Example 13.

TABLE 5

Preparation Example 13

| Preparation Example | PC1 (g) | HC [ppm Pt] | CEOC (g) | SEOC (g) |
|---|---|---|---|---|
| 13 | 269.1 | 7.5 | 9.0 | 3.76 |

Preparation Example 14

Preparation Example 14 follows General Procedure 2 with the only differences being that no First or Second Endcapping Organosilicon Compound was used. Instead, Preparation Example 14 used only the Third Endcapping Organosilicon Compound. In addition, in Preparation Example 14, the Third Endcapping Organosilicon Compound was weighed into the cup with the Polyether Compound 1 and Chain extending Organosilicon Compound, rather than via a syringe. Table 6 below shows the amounts of each component utilized in Preparation Example 14. In Table 6, the content of hydrochloric acid utilized is based on parts per million relative to the amount of Converter utilized.

TABLE 6

Preparation Example 14

| Preparation Example | PC1 (g) | HC [ppm Pt] | CEOC (g) | TEOC (g) | Converter (g) | HCl [ppm] |
|---|---|---|---|---|---|---|
| 14 | 225.0 | 6 | 7.8 | 3.3 | 47.4 | 12 |

Preparation Examples 15-17

Preparation Examples 15-17 follows General Procedure 1 with the only differences being that no Chain Extending Organosilicon Compound was used and Polyether Compound 2 was utilized in lieu of Polyether Compound 1. Table 7 below shows the amounts of each component utilized in Preparation Examples 15-17.

TABLE 7

Preparation Examples 15-17

| Preparation Example | PC2 (g) | HC [ppm Pt] | FEOC (g) | SEOC (g) |
|---|---|---|---|---|
| 15 | 157.5 | 5 | 4.5 | 0.6 |
| 16 | 161.7 | 5 | 3.1 | 1.3 |
| 17 | 152.7 | 5 | 1.5 | 1.8 |

Preparation Example 18

Preparation Example 18 follows General Procedure 1 with the only differences being that no Second Endcapping Organosilicon Compound or Chain Extending Organosilicon Compound was used, and Polyether Compound 2 was utilized in lieu of Polyether Compound 1. Table 8 below shows the amounts of each component utilized in Preparation Example 18.

TABLE 8

| Preparation Example 18 | | | |
|---|---|---|---|
| Preparation Example | PC2 (g) | HC [ppm Pt] | FEOC (g |
| 18 | 105.4 | 5 | 4.125 |

Preparation Example 19

Preparation Example 13 follows General Procedure 1 with the only difference being that no First Endcapping Organosilicon Compound or Chain Extending Organosilicon Compound was used, and Polyether Compound 2 was utilized in lieu of Polyether Compound 1. Table 9 below shows the amounts of each component utilized in Preparation Example 19.

TABLE 9

| Preparation Example 19 | | | |
|---|---|---|---|
| Preparation Example | PC1 (g) | HC [ppm Pt] | SEOC (g) |
| 19 | 160.4 | 5 | 2.6 |

Examples 1-25 and Comparative Examples 1-5

Compositions comprising the silicone-polyether copolymers prepared in Preparation Examples 1-19 were prepared in Examples 1-25 and Comparative Examples 1-5. In certain examples, the particular composition consisted of a particular silicone-polyether copolymer. In other examples, the particular composition comprised a blend of two different silicone-polyether copolymers. Table 10 below shows the silicone-polyether copolymers and relative amounts used in Examples 1-25 and Comparative Examples 1-5.

TABLE 10

| Examples 1-25 and Comparative Examples 1-5: | | | | |
|---|---|---|---|---|
| Example: | First Silicone-Polyether Copolymer | Amount (g) | Second Silicone-Polyether Copolymer | Amount (g) |
| 1 | P.E. 1 | 30 | n/a | n/a |
| 2 | P.E. 2 | 30 | n/a | n/a |
| 3 | P.E. 3 | 30 | n/a | n/a |
| 4 | P.E. 4 | 30 | n/a | n/a |
| 5 | P.E. 5 | 30 | n/a | n/a |
| 6 | P.E. 13 | 22.5 | P.E. 12 | 7.5 |
| 7 | P.E. 13 | 15 | P.E. 12 | 15 |
| 8 | P.E. 13 | 7.5 | P.E. 12 | 22.5 |
| 9 | P.E. 13 | 4.5 | P.E. 12 | 25.5 |
| 10 | P.E. 13 | 1.5 | P.E. 12 | 28.5 |
| 11 | P.E. 15 | 30 | n/a | n/a |
| 12 | P.E. 16 | 30 | n/a | n/a |
| 13 | P.E. 17 | 30 | n/a | n/a |
| 14 | P.E. 6 | 30 | n/a | n/a |
| 15 | P.E. 7 | 30 | n/a | n/a |
| 16 | P.E. 8 | 30 | n/a | n/a |
| 17 | P.E. 9 | 30 | n/a | n/a |
| 18 | P.E. 10 | 30 | n/a | n/a |
| 19 | P.E. 11 | 30 | n/a | n/a |
| 20 | P.E. 12 | 22.5 | P.E. 14 | 7.5 |
| 21 | P.E. 12 | 15 | P.E. 14 | 15 |
| 22 | P.E. 12 | 7.5 | P.E. 14 | 22.5 |
| 23 | P.E. 14 | 22.5 | P.E. 13 | 7.5 |
| 24 | P.E. 14 | 15 | P.E. 13 | 15 |
| 25 | P.E. 14 | 7.5 | P.E. 13 | 22.5 |
| C.E. 1 | P.E. 12 | 30 | n/a | n/a |
| C.E. 2 | P.E. 14 | 30 | n/a | n/a |
| C.E. 3 | P.E. 13 | 30 | n/a | n/a |
| C.E. 4 | P.E. 18 | 30 | n/a | n/a |
| C.E. 5 | P.E. 19 | 30 | n/a | n/a |

Table 11 below shows the viscosity and GPO data for Examples 1-25 and Comparative Examples 1-5 as measured as described above. In Table 11, "n/a" indicates a particular measurement was not taken for a given example.

Viscosity: An Anton Paar MCR-302 Rheometer was used for viscosity measurements. Samples were measured at 25° C. using 8 mm cone and plate of 1-degree cone angle (truncation gap=22 µm; CP08-1) and at 25° C. and 0° C. using 25 mm cone and plate of 2-degree cone angle (truncation gap=106 µm; CP25-2). A constant shear technique was used for all materials. It was confirmed by monitoring the viscosity change that temperature equilibration and sample volatility were not a measurement issue.

GPC: The chromatographic equipment consisted of a Waters 2695 Separations Module coupled to a Waters 2410 differential refractometer. The separation was made with two (300 mm×7.5 mm) Polymer Laboratories PLgel 5 µm Mixed-C columns (molecular weight separation range of 200 to 2,000,000), preceded by a PLgel 5 µm guard column (50 mm×7.5 mm). The analyses were performed using certified grade THF flowing at 1.0 mL/min as the eluent, and the columns and detector were both controlled at 35° C. The samples were prepared in THF at 5 mg/mL, solvated about two hours with occasional shaking, and filtered through 0.45 µm PTFE syringe filters prior to analysis. An injection volume of 100 µL was used and data was collected for 25 minutes. Data collection and analyses were performed using ThermoLabsystems Atlas chromatography software and Polymer Laboratories Cirrus GPC software. Molecular weight averages were determined relative to a calibration curve ($3^{rd}$ order) created using polystyrene standards covering the molecular weight range of 580-2,300,000.

TABLE 11

| Examples 1-25 and Comparative Examples 1-5 | | | | | |
|---|---|---|---|---|---|
| Example: | Viscosity 2 $sec^{-1}$ (mPa) | Viscosity 10 $sec^{-1}$ (mPa) | Mn (Daltons) | Mw (Daltons) | PD |
| 1 | 5.44E+04 | 5.28E+04 | 24715 | 44025 | 1.78 |
| 2 | 5.96E+04 | 5.79E+04 | 25720 | 45900 | 1.78 |
| 3 | 6.35E+04 | 6.20E+04 | 25886 | 47012 | 1.82 |
| 4 | 6.78E+04 | 6.71E+04 | 23741 | 40956 | 1.73 |
| 5 | 7.10E+04 | 7.05E+04 | 24020 | 41359 | 1.72 |
| 6 | 6.22E+04 | 5.99E+04 | 24751 | 44332 | 1.79 |
| 7 | 6.26E+04 | 6.10E+04 | 24871 | 44153 | 1.78 |
| 8 | 6.33E+04 | 6.12E+04 | 25171 | 44245 | 1.76 |
| 9 | 5.63E+04 | 5.48E+04 | 25344 | 44745 | 1.77 |
| 10 | 5.55E+04 | 5.43E+04 | 24474 | 42990 | 1.76 |
| 11 | 1.53E+04 | 1.51E+04 | 25631 | 31481 | 1.228 |
| 12 | 1.58E+04 | 1.56E+04 | 25870 | 32390 | 1.252 |
| 13 | 1.67E+04 | 1.66E+04 | 25125 | 31829 | 1.267 |
| 14 | 4.92E+04 | 4.80E+04 | n/a | n/a | n/a |
| 15 | 4.94E+04 | 4.80E+04 | n/a | n/a | n/a |
| 16 | 5.54E+04 | 5.40E+04 | n/a | n/a | n/a |
| 17 | 3.75E+04 | 3.65E+04 | n/a | n/a | n/a |
| 18 | 4.76E+04 | 4.67E+04 | n/a | n/a | n/a |
| 19 | 4.62E+04 | 4.52E+04 | n/a | n/a | n/a |

TABLE 11-continued

Examples 1-25 and Comparative Examples 1-5

| Example: | Viscosity 2 sec$^{-1}$ (mPa) | Viscosity 10 sec$^{-1}$ (mPa) | Mn (Daltons) | Mw (Daltons) | PD |
|---|---|---|---|---|---|
| 20 | 6.16E+04 | 6.01+04 | n/a | n/a | n/a |
| 21 | 6.21E+04 | 6.07E+04 | n/a | n/a | n/a |
| 22 | 6.29E+04 | 6.18E+04 | n/a | n/a | n/a |
| 23 | 6.14E+04 | 6.02E+04 | n/a | n/a | n/a |
| 24 | 6.20E+04 | 6.05E+04 | n/a | n/a | n/a |
| 25 | 6.27E+04 | 6.15E+04 | n/a | n/a | n/a |
| C.E. 1 | 6.99E+04 | 6.98E+04 | 26452 | 45930 | 1.74 |
| C.E. 2 | 7.48E+04 | 7.25E+04 | 26260 | 50809 | 1.93 |
| C.E. 3 | 5.38E+04 | 5.35E+04 | 24291 | 43828 | 1.80 |
| C.E. 4 | 1.52E+04 | 1.47E+04 | 25634 | 31120 | 1.214 |
| C.E. 5 | 1.69E+04 | 1.67E+04 | 26264 | 34563 | 1.316 |

Sealant Examples 1-25 and Comparative Sealant Examples 1-5

In Sealant Examples 1-25 and Comparative Sealant Examples 1-5, sealants were formed with the compositions of Examples 1-25 and Comparative Examples 1-5. To form the sealants with the compositions of Examples 1-25 and Comparative Examples 1-5, 1000 parts per million by weight (ppmw) of Catalyst and 5000 ppmw Adhesion Promoter were combined with each of the compositions of Examples 1-25 and Comparative Examples 1-5. The components of each of the Sealant Examples 1-25 and Comparative Sealant Examples 1-5 were mixed in a 40 g capacity polypropylene mixing cup for a Flacktek SpeedMixer® and mixed at 2000 rpm for 1 minute to give each sealant in the form of a homogenous mixture. Each sealant of Sealant Examples 1-25 and Comparative Sealant Examples 1-5 was cured to give a cured product, and the properties of each cured product were measured as described below.

Tensile Test: Tensile properties were measured in accordance with ASTM D$^{412}$. In particular, each sealant was cast onto a Teflon plate 10 cm by 10 cm in size and with edge guard. The Teflon plate was placed in a room with relatively humidity controlled at 50%, and temperature controlled to be 23° C. The plate was left in the room to cure for 7 days, then moved into an air circulating oven set at 50° C. with atmospheric moisture content not regulated and kept in the oven for 4 days. The sample was then taken out of the oven and cooled to room temperature. Dogbone specimens were cut from the sample with a carbon steel die for determining tensile strength, and small pieces are cut from the sample for differential scanning calorimetry (DSC).

The dogbone sample size for the tensile test was 50 mm long with a narrow neck length of 20 mm. An MTS testing frame with a load cell of 100 N full capacity was used for the tensile test. The testing speed was 50.8 cm/min. The strain is calculated as displacement over the length of the narrow neck. Stress at break is calculated by dividing the peak stress with the initial cross-sectional area of the narrow neck region.

Tack Free Time: A Drying Time Recorder from TOO was used to determine Tack Free Time (TFT) of the sealants. The Drying Time Recorder is a fully digitally controlled machine that operates in conformance with the BK (Beck Koller) method and meets ASTM D$^{5895}$, ISO 9117-4 and DIN EN 14022. The Drying Time Recorder was positioned in a chamber with constant 50% humidity. The Drying Time Recorder was equipped with a carrier having 6 needles which can lowered on top of up to 6 25×300 mm aluminum panels which are coated with a 4-mil thick film of sealant. The needles are then slowly drawn over the panels for a period of time which is set to encompass the final cure time of each sealant. The evaluation of Tack Free Time (TFT) was done by moving the carrier over the panels and to the onset points of the cure stages. TFT could then be determined by linking the visual indications of the cure process with the associated time read out by the Drying Time Recorder.

Hardness of each cured product was measured in accordance with ASTM D2240.

Tables 12 and 13 below show the tack free time, tensile strength properties, and hardness of each of the sealants and cured products of Sealant Examples 1-25 and Comparative Sealant Examples 1-5.

TABLE 12

Sealant Examples 1-25 and Comparative Sealant Examples 1-5:

| Example: | Tack Free Time (min) | Stress at 25% Strain (MPa) | Stress at 25% Strain STDEV | Stress at 100% Strain (MPa) | Stress at 100% Strain STDEV | Young's Modulus (MPa) | Young's Modulus STDEV |
|---|---|---|---|---|---|---|---|
| 1 | 42 | 0.070 | 0.001 | 0.197 | 0.002 | 0.322 | 0.010 |
| 2 | 59 | 0.061 | 0.001 | 0.170 | 0.004 | 0.260 | 0.007 |
| 3 | 117 | 0.042 | 0.003 | 0.122 | 0.003 | 0.167 | 0.016 |
| 4 | 25 | 0.040 | 0.002 | 0.084 | 0.004 | 0.161 | 0.009 |
| 5 | 40 | 0.045 | 0.007 | 0.071 | 0.020 | 0.176 | 0.026 |
| 6 | 86 | 0.085 | 0.008 | 0.216 | 0.011 | 0.299 | 0.056 |
| 7 | 2419 | 0.062 | 0.005 | 0.139 | 0.004 | 0.232 | 0.040 |
| 8 | 288 | 0.050 | 0.011 | 0.113 | 0.010 | 0.139 | 0.047 |
| 9 | 252 | 0.058 | 0.005 | 0.089 | 0.012 | 0.182 | 0.046 |
| 10 | 2809 | 0.033 | 0.009 | 0.067 | 0.016 | 0.153 | 0.019 |
| 11 | 17 | 0.225 | 0.002 | 0.644 | 0.006 | 1.080 | 0.030 |
| 12 | 21 | 0.230 | 0.002 | 0.661 | 0.010 | 1.116 | 0.032 |
| 13 | 53 | 0.230 | 0.001 | 0.627 | 0.023 | 1.080 | 0.028 |
| 14 | 22 | 0.078 | 0.011 | 0.196 | 1.352 | 0.294 | 0.102 |
| 15 | 38 | 0.053 | 0.006 | 0.182 | 1.244 | 0.233 | 0.041 |
| 16 | 52 | 0.082 | 0.012 | 0.182 | 1.461 | 0.273 | 0.027 |
| 17 | 93 | 0.053 | 0.017 | 0.114 | 0.022 | 0.138 | 0.028 |
| 18 | 211 | 0.037 | 0.012 | 0.082 | 0.020 | 0.186 | 0.019 |
| 19 | 415 | 0.025 | 0.007 | 0.088 | 0.012 | 0.169 | 0.021 |
| 20 | 27 | 0.095 | 0.007 | 0.240 | 0.007 | 0.374 | 0.029 |
| 21 | 28 | 0.079 | 0.003 | 0.220 | 0.004 | 0.270 | 0.019 |
| 22 | 53 | 0.079 | 0.009 | 0.185 | 0.008 | 0.310 | 0.048 |
| 23 | 88 | 0.048 | 0.011 | 0.128 | 0.006 | 0.178 | 0.048 |
| 24 | 192 | 0.049 | 0.010 | 0.104 | 0.008 | 0.171 | 0.032 |
| 25 | 346 | 0.046 | 0.006 | 0.081 | 0.013 | 0.161 | 0.019 |
| C.E. 1 | 24 | 0.098 | 0.005 | 0.275 | 0.008 | 0.471 | 0.017 |
| C.E. 2 | 74 | 0.082 | 0.017 | 0.197 | 0.008 | 0.225 | 0.007 |
| C.E. 3 | 6638 | 0.042 | 0.017 | 0.111 | 0.005 | 0.091 | 0.008 |
| C.E. 4 | 15 | 0.274 | 0.007 | n/a | n/a | 1.318 | 0.062 |
| C.E. 5 | 680 | 0.226 | 0.012 | 0.631 | 0.007 | 1.076 | 0.030 |

TABLE 13

Sealant Examples 1-25 and Comparative Sealant Examples 1-5:

| Example: | Strain at Peak (%) | Strain at Peak STDEV | Break Stress (MPa) | Break Stress STDEV | Hardness (Duro 00) |
|---|---|---|---|---|---|
| 1 | 245.6 | 29.6 | 0.364 | 0.033 | 71.3 |
| 2 | 325.8 | 25.4 | 0.395 | 0.034 | 75.2 |
| 3 | 491.0 | 67.5 | 0.411 | 0.059 | 65.3 |
| 4 | 676.0 | 76.2 | 0.329 | 0.037 | 63.3 |
| 5 | 691.8 | 27.6 | 0.331 | 0.024 | 67.0 |
| 6 | 261.5 | 8.5 | 0.413 | 0.016 | 75.3 |
| 7 | 318.5 | 33.1 | 0.334 | 0.028 | 75.3 |
| 8 | 464.7 | 24.6 | 0.3748 | 0.020 | 77.7 |
| 9 | 624.6 | 35.8 | 0.378 | 0.062 | 69.2 |
| 10 | 794.5 | 31.4 | 0.366 | 0.037 | 60.4 |
| 11 | 94.7 | 12.1 | 0.624 | 0.051 | 87.1 |
| 12 | 100.7 | 7.0 | 0.662 | 0.034 | 86.5 |
| 13 | 102.3 | 10.1 | 0.650 | 0.038 | 87.4 |
| 14 | 254.1 | 13.7 | 0.376 | 0.027 | 73.0 |

TABLE 13-continued

Sealant Examples 1-25 and Comparative Sealant Examples 1-5:

| Example: | Strain at Peak (%) | Strain at Peak STDEV | Break Stress (MPa) | Break Stress STDEV | Hardness (Duro 00) |
|---|---|---|---|---|---|
| 15 | 264.0 | 10.0 | 0.348 | 0.009 | 70.9 |
| 16 | 249.6 | 30.5 | 0.373 | 0.049 | 73.3 |
| 17 | 405.8 | 36.8 | 0.227 | 0.033 | 78.6 |
| 18 | 537.0 | 30.3 | 0.273 | 0.035 | 56.0 |
| 19 | 691.3 | 45.1 | 0.513 | 0.059 | 61.5 |
| 20 | 206.9 | 16.2 | 0.387 | 0.027 | 79.7 |
| 21 | 223.8 | 9.0 | 0.378 | 0.015 | 77.3 |
| 22 | 223.4 | 8.7 | 0.328 | 0.011 | 77.2 |
| 23 | 315.6 | 17.7 | 0.301 | 0.017 | 77.2 |
| 24 | 462.2 | 22.2 | 0.333 | 0.023 | 68.5 |
| 25 | 667.5 | 46.9 | 0.450 | 0.056 | 63.7 |
| C.E. 1 | 223.5 | 18.1 | 0.463 | 0.040 | 77.4 |
| C.E. 2 | 264.4 | 31.1 | 0.363 | 0.027 | 60.4 |
| C.E. 3 | 920.7 | 42.0 | 0.6226 | 0.056 | 13.7 |
| C.E. 4 | 88.2 | 6.0 | 0.685 | 0.039 | 87.9 |
| C.E. 5 | 107.4 | 9.0 | 0.656 | 0.033 | 86.0 |

FIG. 1 shows the tack free time for certain sealants (i.e., those of Comparative Examples 1 and 3, and Examples 1-3 and 7-8) as a function of the mole % of silicone moieties X of the First Organosilicon Endcapping Compound, which is a silicone moiety X of formula (I). FIG. 1 shows that Comparative Example 3, which included no silicone moiety X of formula (I), had a TFT of 6638 minutes, whereas Comparative Example 1, which included only silicone moieties X of formula (I) (i.e., to the exclusion of silicone moieties X of formula (II)), had a TFT of only 24 minutes. Surprisingly, increasing a content of silicone moieties X of formula (I) even in relatively small amounts drastically reduced TFT from 6638 minutes to 288 minutes (see Comparative Example 3 versus Example 8). As shown in the Examples, despite the significant improvement in TFT, mechanical properties were not sacrificed due to the content of silicone moieties X of formula (II).

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A composition comprising at least one silicone-polyether copolymer having the average formula $X_g[Z_jY_o]_c$ wherein the silicone polyether copolymer includes at least one silicone moiety X of formula (I) and at least one silicone moiety X of formula (II) (II) in the same molecule:

(I)

(II)

wherein each Y is an independently selected polyether moiety, and each Z is an independently selected organosilicon moiety, where each $R^1$ is an independently selected substituted or unsubstituted hydrocarbyl group having from 1 to 18 carbon atoms; each $R^2$ is an independently selected alkyl group having from 1 to 8 carbon atoms; each D is independently a divalent hydrocarbon group having from 2 to 1 carbon atoms; each $D^1$ is independently a divalent hydrocarbon group having from 2 to 18 carbon atoms; each subscript a is independently 0 or 1; subscript c is from 1 to 150; subscript g>1; each subscript j is independently 0 or 1; each subscript o is independently 0 or 1, with the provisos that 1≤j+o≤2 in each moiety indicated by subscript c and that there is at least one moiety indicated by subscript c in which subscript o is 1.

2. The composition of claim 1, comprising a molar ratio of the silicone-polyether copolymer (A) to the silicone-polyether copolymer (B) of from 2:98 to 98:2 (A):(B).

3. The composition of claim 1, wherein: (i) each polyether moiety Y comprises a polyether group having the formula —O—$(C_nH_{2n}O)_w$—, wherein subscript n is independently selected from 2 to 4 in each moiety indicated by subscript w, and subscript w is from 1 to 1000; (ii) each polyether moiety Y has a number average molecular weight of at least about 100; (iii) at least one polyether moiety Y is a polyhydroxyl polyether; or (vi) a combination of (i)-(iii).

4. The composition of claim 1, wherein each polyether moiety Y has the formula:

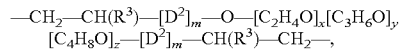

wherein each $R^3$ is independently a hydrocarbyl group having from 1 to 6 carbon atoms, an alkoxy group, a silyl group, or H; each $D^2$ is an independently selected divalent group having from 1 to 6 carbon atoms, subscript m is 0 or 1, subscript x is from 0 to 999, subscript y is from 1 to 1000, and subscript z is from 0 to 999, and wherein units indicated by subscripts x, y and z may be in randomized or block form in the polyether moiety Y; and wherein each organosilicon moiety Z independently has the formula:

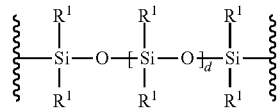

wherein each $R^1$ is independently selected and defined above, and each d is independently from 0 to 999 in each organosilicon moiety Z.

5. A method of preparing a composition comprising at least one silicone-polyether copolymer, said method comprising:

reacting a polyether compound having on average more than one terminal unsaturated group, optionally a chain extending organosilicon compound, a first endcapping organosilicon compound, and a second endcapping organosilicon compound different from the first endcapping organosilicon compound, in the presence of a hydrosilylation catalyst to prepare the composition comprising the at least one silicone-polyether copolymer;

wherein the silicone-polyether copolymer has the average formula $X_g[Z_jY_o]_c$, wherein each X is independently a silicone moiety having one of formulas (I) or (II):

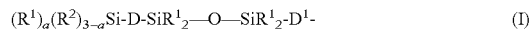

(I)

(II)

wherein each Y is an independently selected polyether moiety, and each Z is an independently selected organosilicon moiety, where each $R^1$ is an independently selected substituted or unsubstituted hydrocarbyl group having from 1 to 18 carbon atoms; each $R^2$ is an independently selected alkyl group having from 1 to 8 carbon atoms; each D is independently a divalent hydrocarbon group having from 2 to 18 carbon atoms; each $D^1$ is independently a divalent hydrocarbon group having from 2 to 18 carbon atoms; each subscript a is independently 0 or 1; subscript c is from 1 to 150; subscript g>1; each subscript j is independently 0 or 1; each subscript o is independently 0 or 1, with the provisos that $1 \leq j+o \leq 2$ in each moiety indicated by subscript c and that there is at least one moiety indicated by subscript c in which subscript o is 1;

subject to at least one of the following two provisos:

(i) the silicone-polyether copolymer includes at least one silicone moiety X of formula (I) and at least one silicone moiety X of formula (II); and/or (ii) the composition comprises at least one silicone-polyether copolymer (A) where each silicone moiety X is of formula (I), and at least one silicone-polyether copolymer (B) where each silicone moiety X is of formula (II).

6. The method of claim 5, wherein the polyether compound has the formula:

$$Y^1[R^4]_i$$

wherein each $R^4$ is an independently selected unsaturated group having from 2 to 14 carbon atoms; subscript i is >1; and $Y^1$ is an independently selected polyether moiety comprising a polyether group having the formula —O—$(C_nH_{2n}O)_w$—, wherein subscript n is independently selected from 2 to 4 in each moiety indicated by subscript w, and subscript w is from 1 to 1000.

7. The method of claim 6, wherein in the polyether compound:

(i) the polyether moiety $Y^1$ has the formula:

$$—O—[C_2H_4O]_x[C_3H_6O]_y[C_4H_8O]_z—$$

wherein each subscript x is independently from 0 to 999, each subscript y is independently from 1 to 1000, and each subscript z is independently from 0 to 999, and wherein units indicated by subscripts x, y and z may be in randomized or block form in the polyether moiety $Y_1$;

(ii) each $R^4$ has the formula:

$$CH_2C(R^3)\text{-}[D^2]_m\text{-},$$

wherein each $R^3$ is independently a hydrocarbyl group having from 1 to 6 carbon atoms, an alkoxy group, a silyl group, or H; each $D^2$ is an independently selected divalent group having from 1 to 6 carbon atoms, and subscript m is 0 or 1; or (iii) both (i) and (ii).

8. The method of claim 5, wherein:

the chain extending organosilicon compound is utilized and comprises a linear silicon hydride functional organosilicon compound has the formula:

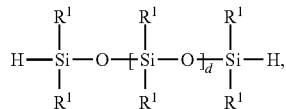

wherein each $R^1$ is an independently selected substituted or unsubstituted hydrocarbyl group having from 1 to 18 carbon atoms; and each subscript d is from 1 to 999;

wherein the first endcapping organosilicon compound has the formula:

$$(R^1)_a(R^2O)_{3-a}Si\text{-}D\text{-}SiR^1_2—O—SiR^1_2H$$

wherein each $R^1$ is independently selected and defined above, each $R^2$ is an independently selected alkyl group having from 1 to 8 carbon atoms; each D is independently a divalent hydrocarbon group having from 2 to 18 carbon atoms; and subscript a is 0 or 1; and wherein the second endcapping organosilicon compound has the formula $$(R^1)_a(R^2O)_{3-a}SiH$$

wherein $R^1$, $R^2$ and subscript a are defined above.

9. The composition of claim 1, further defined as a sealant, and wherein the sealant further comprises a condensation reaction catalyst.

10. The composition of claim 9, further comprising: (i) a filler; (ii) a filler treating agent; (iii) a cross-linker; (iv) a surface modifier, (v) a drying agent; (vi) an extender; (vii) a biocide; (viii) a flame retardant; (ix) a plasticizer; (x) an end-blocker; (xi) a binder; (xii) an anti-aging additive; (xiii) a water release agent; (xiv) a pigment and/or a dye; (xv) a rheology modifier; (xvi) a carrier; (xvii) a tackifying agent; (xviii) a corrosion inhibitor; (xix) a catalyst inhibitor; (xx) an adhesion promotor; (xxi) a viscosity modifier; (xxii) a UV absorber; (xxiii) an anti-oxidant; (xxiv) a light-stabilizer; or (xxv) a combination of (i)-(xxiv).

11. A cured product of the composition of claim 9.

12. A composite article comprising a substrate and the cured product of claim 11 disposed on the substrate.

13. A method of preparing a composite article, said method comprising:

disposing a composition on a substrate; and curing the composition to give a cured product on the substrate, thereby forming the composite article;

wherein the composition is the composition of claim 9.

14. A method of sealing a space defined between two elements, said method comprising:

applying a composition to the space; and curing the composition in the space, thereby sealing the space;

wherein the composition is the composition of claim 9.

15. A composition comprising at least one silicone-polyether copolymer having the average formula $X_g[Z_jY_o]_c$, wherein each X is independently a silicone moiety having one of formulas (I) or (II):

$$(R^1)_a(R^2O)_{3-a}Si\text{-}D\text{-}SiR^1_2—O—SiR^1_2\text{-}D^1\text{-} \quad (I)$$

$$(R^1)_a(R^2O)_{3-a}Si\text{-}D^1\text{-} \quad (II)$$

wherein each Y is an independently selected polyether moiety, and each Z is an independently selected organosilicon moiety, where each $R^1$ is an independently selected substituted or unsubstituted hydrocarbyl group having from 1 to 18 carbon atoms; each $R^2$ is an independently selected alkyl group having from 1 to 8 carbon atoms; each D is independently a divalent hydrocarbon group having from 2 to 18 carbon atoms; each $D^1$ is independently a divalent hydrocarbon group having from 2 to 18 carbon atoms; each subscript a is independently 0 or 1; subscript c is from 1 to 150; subscript g>1; each subscript j is independently 0 or 1, with the proviso that j is 1 in at least one moiety indicated by subscript c; each subscript o is independently 0 or 1, with the provisos that $1 \leq j+o \leq 2$ in each moiety indicated by subscript c and that there is at least one moiety indicated by subscript c in which subscript o is 1;

subject to at least one of the following two provisos:

(i) the silicone-polyether copolymer includes at least one silicone moiety X of formula (I) and at least one silicone moiety X of formula (II); and/or (ii) the composition comprises at least one silicone-polyether copolymer (A) where each silicone moiety X is of formula (I), and at least one silicone-polyether copolymer (B) where each silicone moiety X is of formula (II).

16. The composition of claim 15, wherein proviso (ii) is true, comprising a molar ratio of the silicone-polyether copolymer (A) to the silicone-polyether copolymer (B) of from 2:98 to 98:2 (A):(B).

17. The composition of claim 15, wherein: (i) each polyether moiety Y comprises a polyether group having the formula —O—$(C_nH_{2n}O)_w$—, wherein subscript n is independently selected from 2 to 4 in each moiety indicated by subscript w, and subscript w is from 1 to 1000; (ii) each polyether moiety Y has a number average molecular weight of at least about 100; (iii) at least one polyether moiety Y is a polyhydroxyl polyether; or (vi) a combination of (i)-(iii).

18. The composition of claim 15, wherein each polyether moiety Y has the formula:

—$CH_2$—$CH(R^3)$—$[D^2]_m$—O—$[C_2H_4O]_x[C_3H_6O]_y$
$[C_4H_8O]_z$—$[D^2]_m$—$CH(R^3)$—$CH_2$—, wherein each $R^3$ is independently a hydrocarbyl group having from 1 to 6 carbon atoms, an alkoxy group, a silyl group, or H; each $D^2$ is an independently selected divalent group having from 1 to 6 carbon atoms, subscript m is 0 or 1, subscript x is from 0 to 999, subscript y is from 1 to 1000, and subscript z is from 0 to 999, and wherein units indicated by subscripts x, y and z may be in randomized or block form in the polyether moiety Y; and wherein each organosilicon moiety Z independently has the formula:

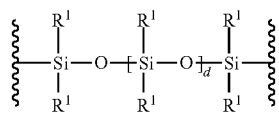

wherein each $R^1$ is independently selected and defined above, and each d is independently from 0 to 999 in each organosilicon moiety Z.

* * * * *